United States Patent Office 3,195,114
Patented July 13, 1965

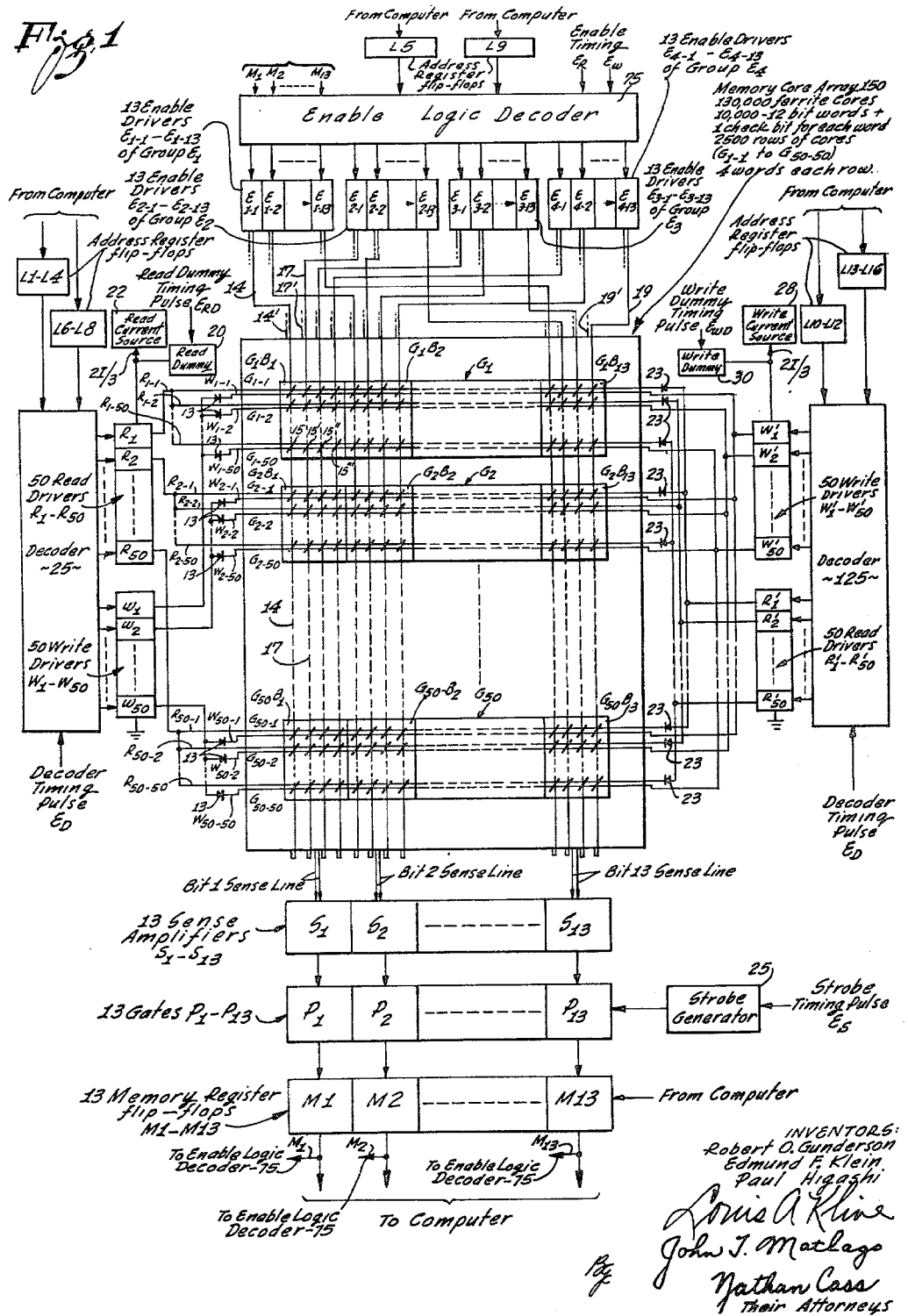

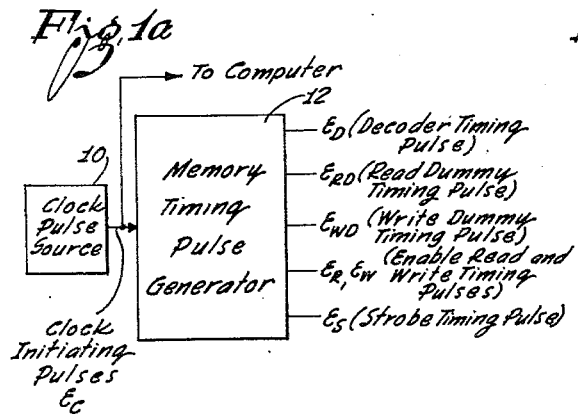
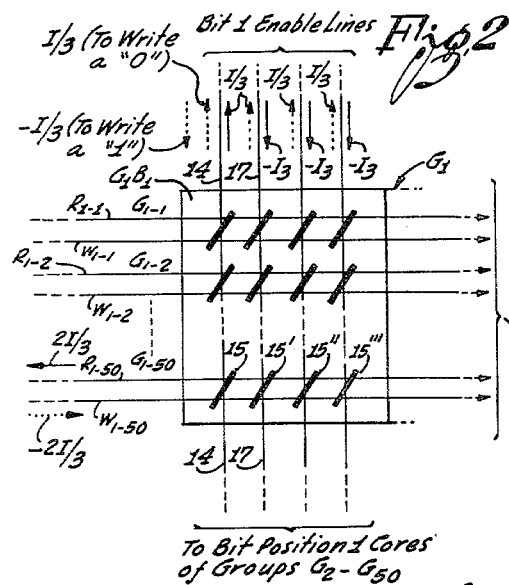
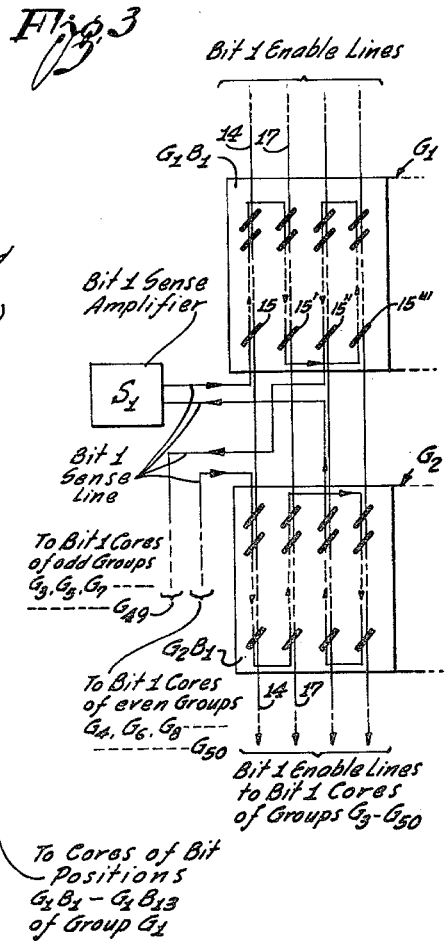
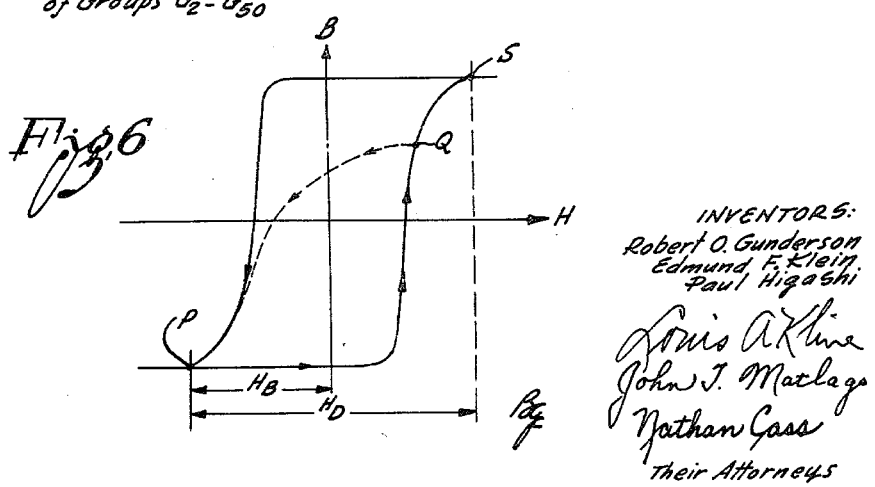

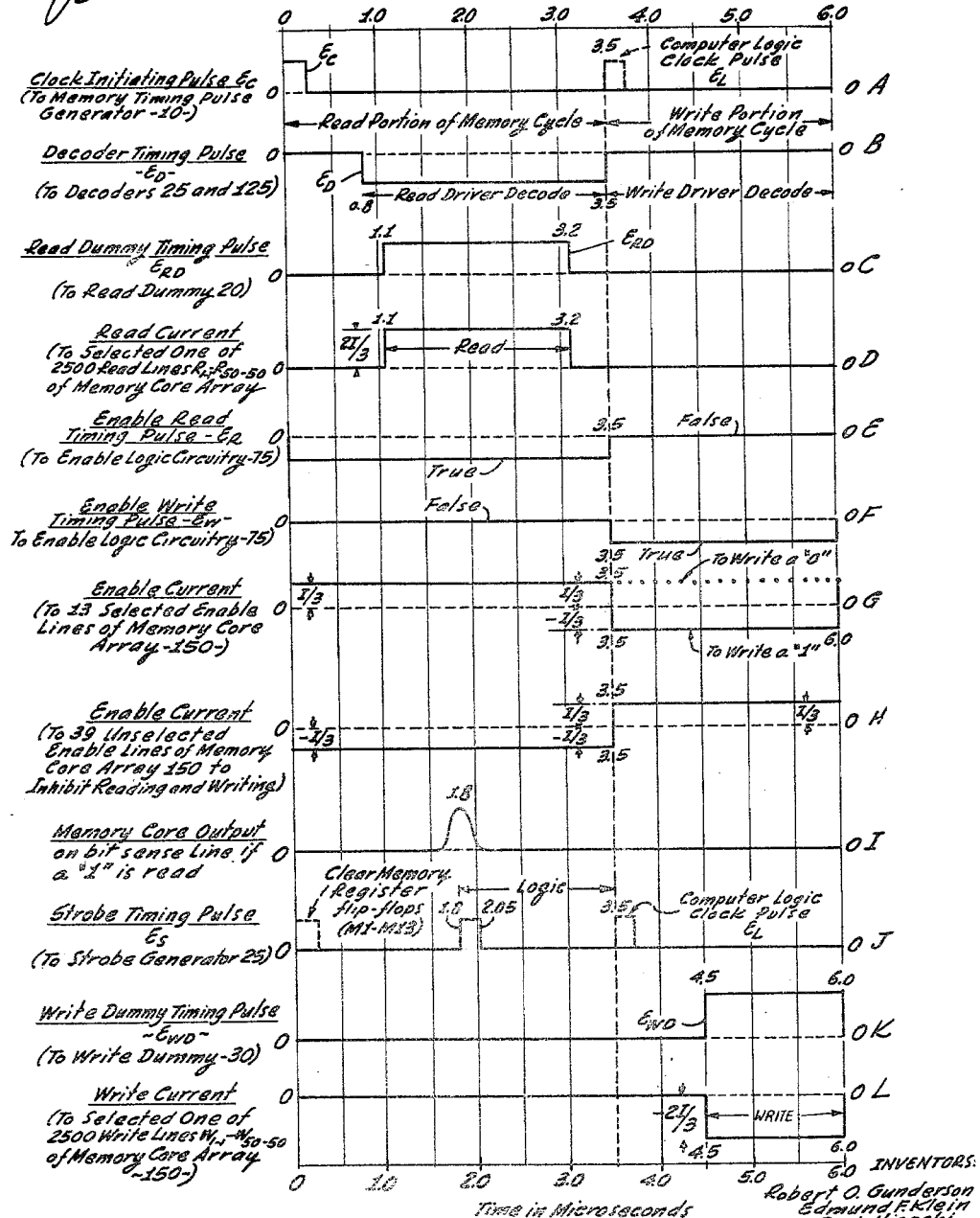

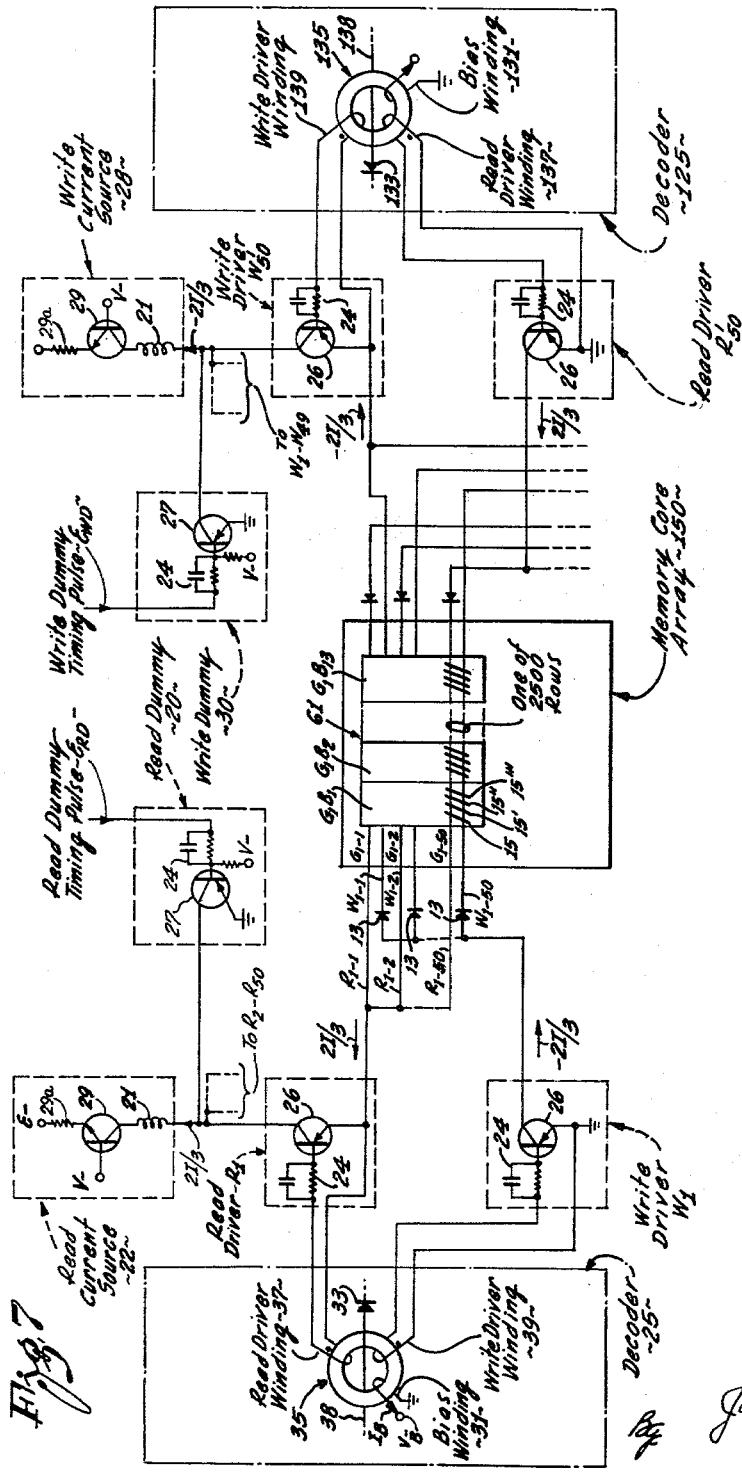

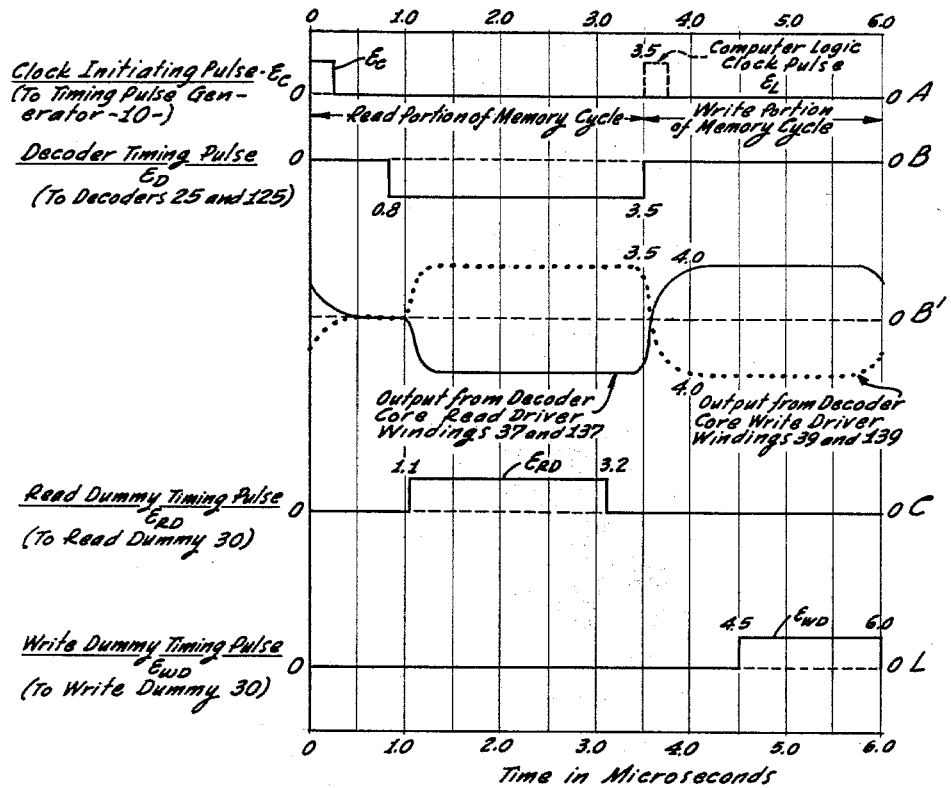

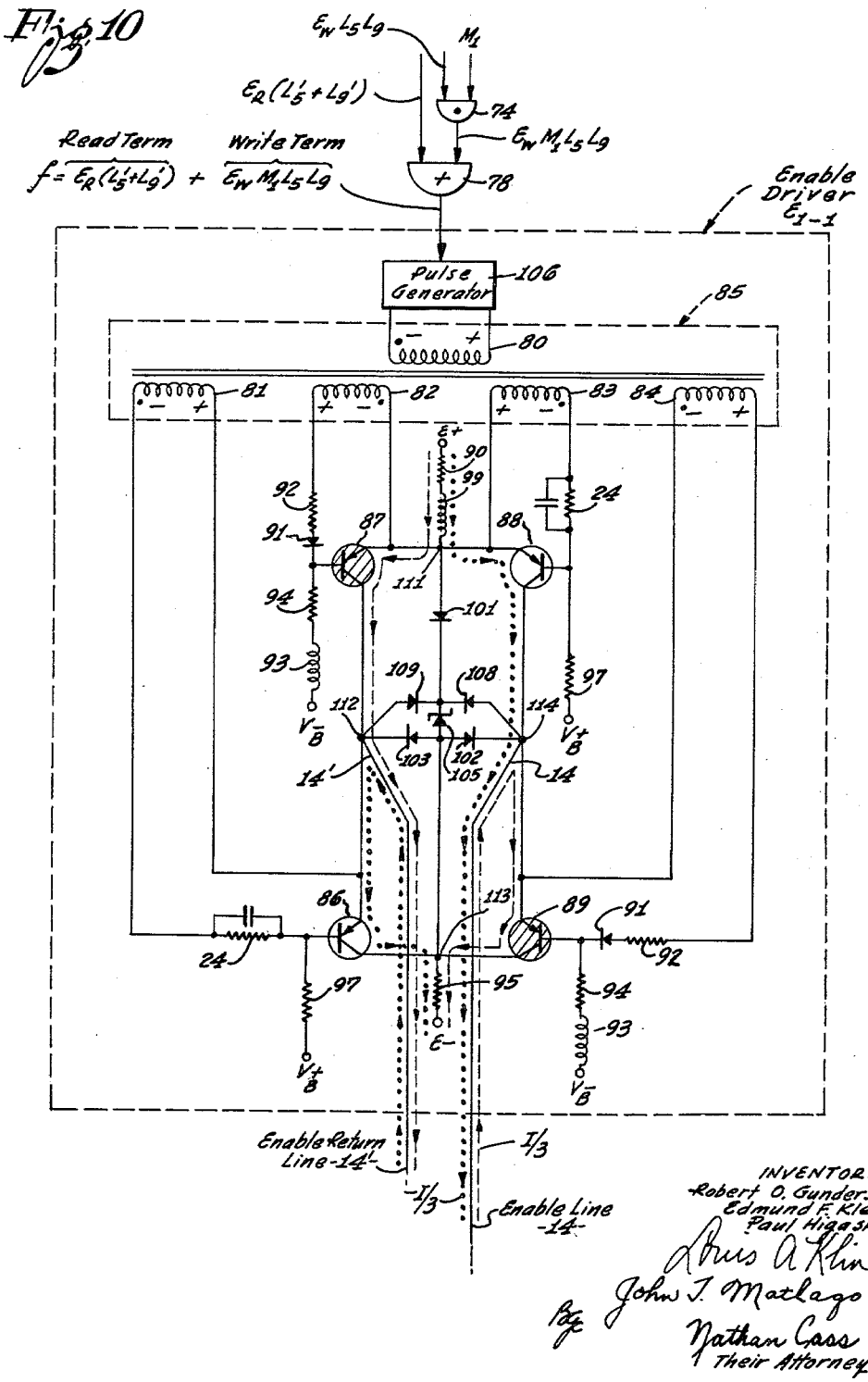

3,195,114
DATA-STORAGE SYSTEM
Robert O. Gunderson, Torrance, Edmund F. Klein, San Pedro, and Paul Higashi, Los Angeles, Calif., assignors to The National Cash Register Company, Dayton, Ohio, a corporation of Maryland
Filed Feb. 23, 1961, Ser. No. 91,123
16 Claims. (Cl. 340—174)

This invention relates to data-storage means for storage of information or data presented in binary form, and more specifically to magnetic data-storage means and the method of operation thereof.

In the digital data-processing and control arts, it is known that data or information represented in binary form as binary digits or "bits," may be stored in one or more bistable magnetic elements, the binary digits or bits being commonly represented by the symbols "1" and "0" corresponding to the two possible remanent states of a bistable magnetic element.

Accordingly, in this mode of data-representation, a "1" is represented by one remanent state of the magnetic element, while a "0" is represented by the opposite remanent state of the element. Extraction or "reading" out of a binary digit or bit from a magnetic element in which it is stored is then conventionally accomplished by applying a coercive or driving effect in a direction which acts to drive the magnetic element from "1" to "0," any change in the remanent state of the magnetic element being indicated by means of a "sense" line disposed in inductive relation thereto. Thus, if the magnetic element is initially in the "1" state, it will switch to the "0" state and in so doing will induce a potential in the "sense" line to indicate a "1" was stored. On the other hand, if the magnetic element is initially in the "0" state and no potential will be induced in the sense line, thereby indicating a "0" was stored. In any case, after reading, the magnetic element will be in the "0" state.

To "write" into or store a digit in the magnetic element, a coercive or driving effect is then applied in a direction which acts to drive the magnetic elements from "0" to "1" if a "1" is to be stored, and if a "0" is to be stored, either no driving effect is applied, or else, for engineering reasons, an additional "inhibit" drive may be provided in the opposite or "1" to "0" direction to prevent the magnetic element from changing from its "0" state.

The coercive or driving effect necessary to drive a bistable magnetic element from either remanent state to the other is of substantially the same magnitude, and in the prior art is commonly produced by contemporaneous passage of respective currents through each of at least two conductors, both of which are disposed in inductive relationship with the magnetic element. In the most commonly known system of selecting a magnetic element for reading, use is made of two separate currents, usually as pulses of brief duration, whose total magnitude with respect to the magnetic element is sufficient to drive the element from one remanent state to the other, if the magnetic element is not already in the remanent state toward which the drive currents are acting.

In data-storage systems many storage elements are usually necessary, and when bistable magnetic elements are employed for data-storage, the elements are commonly ferrite cores arranged in arrays of two-dimensional character in which the cores and their respective coils are disposed in rows and columns. A row drive coil and a column drive coil is inductively coupled to each core. The column drive coils of cores in respective columns are connected in series, and likewise the row drive coils of cores in respective rows are connected in series. Selection of a particular core in such an array is then accomplished by applying half select currents (that is, currents each equal to one-half the value required to switch the magnetic element from one remanent state to the other) to the particular row and column drive lines in which the element to be selected is located in the array, each half select current by itself being insufficient to switch a core. Thus, while other magnetic elements in the same row and column of the magnetic element to be selected receive half select current, the selected magnetic core at the row-column intersection receives full-select current to switch the core to the "0" state, if the core is not already in that state.

As pointed out previously, for "reading" out the bit or digit stored in a magnetic element, the element is conventionally driven in the "1" to "0" direction; while for "writing" into the element, it is driven in the "0" to "1" direction if a "1" is to be written, and if a "0" is to be written, either no driving effort is applied or, more usually, an additional "inhibit" drive is provided in the "1" to "0" direction to maintain the element in the "0" state. Thus, in the conventional two-dimensional array of cores referred to above, reading is accomplished by applying half select currents in the "1" to "0" direction to the respective row and column drive lines of a selected core. A sense coil or line inductively coupled to all cores in the array provides an output signal if the selected core switched, indicating that a "1" was stored, and no output signal (or negligible output signal) if the core did not switch, indicating that a "0" was stored. To eliminate unwanted induced signals (noise) resulting from transients or half selected cores, the sense line is ordinarily coupled to the cores in the array so that noise from partially selected cores cancel out, thereby making the induced pulse occurring when a selected core is switched clearly dominant and easily recognizable.

In writing into a selected core of this conventional two-dimensional array (which generally immediately follows reading out of the same core), half select currents are again applied to the row and column drive lines of the selected core, but this time in the "0" to "1" direction. An inhibit coil or line is conventionally provided inductively coupled to all the cores of the array and, if a "0" is to be written into the selected core, the inhibit line is energized with half select current in the "1" to "0" direction to inhibit the writing of a "1" into the selected core—that is, to keep the core in the "0" state and effectively store a "0" therein. On the other hand, if a "1" is to be written into the selected core, the inhibit line remains unenergized permitting the half select currents applied to the row and column drive lines of the selected core to switch the selected core to the "1" state and thereby effectively store a "1" therein.

In order to permit many cores to be read out of or written into at one time (that is, in parallel), a plurality of these two-dimensional arrays or planes may be stacked to form a three-dimensional array. Usually, only a single drive line is employed for each row or column, and is passed in series through all the cores of corresponding rows and columns in each plane. Thus, during reading and writing, a core having the same row and column coordinates is simultaneously selected in each two-dimensional array. One sense line is provided for each two-dimensional array, so that during reading, the digit stored in the selected core thereof may be indicated by its respective sense line. Also, an inhibit line is provided for each two-dimensional array, so that during writing, the selected core of each plane may be permitted to switch to its "1" state to store a "1" or, may be inhibited by half select current in the "1" to "0" direction to remain in the "0" state and thereby store a "0."

Further details of the above-described coincident-current two-dimensional array and its three-dimensional counterpart, as well as other variations thereof, may be found in various publications, such as U.S. Patents 2,691,155, 2,709,248, and 2,736,880 and the publications cited in those patents.

Coincident-current selection systems as briefly described above for selecting one or a plurality of magnetic elements or cores in a two or three-dimensional array thereof have found considerable use in the art, chiefly because of the economy and relative simplicity of the decoder and drive circuitry required therefor. However, a coincident-current selection system suffers from a number of disadvantages which prevent or severely limit its use in various applications. In particular, when a coincident-current selection system is employed, a bistable magnetic element must be able to tolerate a half selected current without having its magnetic state detrimentally disturbed. This requirement is necessary because, as indicated previously, unselected cores in the selected row or column each receive a half select current when the selected magnetic element at the selected row-column intersection is receiving the full select current necessary to switch the element from one state to the other. If the hysteresis loop of each magnetic element were ideal (that is, perfectly square), and also uniform for a plurality of elements, a half select current could safely be applied to an element without fear of unwanted switching of the state of the element, or inducement of unwanted signal voltages due to any partial switching thereof. Also, it could then be assured that the same full select current would always be sufficient to switch the selected magnetic element.

Unfortunately, as is well known in the art, hysteresis loops of known bistable magnetic elements are far from ideal or uniform and measures must be taken to insure that selected magnetic elements reliably switch, while unselected magnetic elements do not switch or introduce deleterious signals into the sense windings used for reading out of the array. Such measures often place severe restrictions on the drive circuitry as well as on the type and necessary uniformity of the magnetic elements employed. The problem is further complicated by the fact that hysteresis loops of magnetic elements are temperature sensitive, a change of about 0.35% per degree centigrade in the width of a hysteresis loop of a ferrite core being typical. It will be appreciated, therefore, that where operation over a wide temperature range is required, the temperature sensitivity of such magnetic elements could severely affect the reliability of a coincident-current selection system, which provides only a 2 to 1 ratio between the driving effort applied to selected and unselected cores.

Another problem with coincident-current selection systems, particularly in three-dimensional arrays, arises because of the large number of cores through which a column or row drive line may be required to pass in an array of reasonable size. In such a situation, the back-voltage generated by the linear inductance of the line and the half-selected cores on a particular drive line may become appreciable and, as a result, significantly reduce the efficiency of operation of the system, as well as introducing unwanted transients and delays which reduce the speed at which the system may be operated. Because of these effects occurring when a row or column drive line passes through a large number of cores, it is often necessary to limit the size of an array, or else, take compensating measures in the external circuitry, which may involve considerable increased circuitry or complexity.

From the above discusssion, it should now be evident that a coincident-current selection system is far from ideal, particularly since only a 2 to 1 ratio is provided between the driving effort applied to selected and unselected magnetic element, which as brought out above, may be inadequate where high reliability operation at high speeds is required over a wide temperature range. Also, measures which may be provided to improve reliability or overcome the effect of stringing many cores on a drive line may result in increased complexity in the external circuitry, which greatly detracts from the basic economy and simplicity of the system.

One way of obviating the above indicated short-comings of a coincident-current selection system involves the use of a direct selection system in which only those magnetic elements or cores which are to be read out in parallel are disturbed during the reading operation. A predetermined group of digits or bits is commonly referred to as a "word," and in a direct selection system, the group of bits or digits read out in parallel may be considered as such a "word." The magnetic elements are cores making up a word are threaded by a common drive line which passes only through these cores and no others. Thus, a drive line is provided for each word in the array and the plurality of cores which store the digits of a selected word may be read out in parallel by providing full-select current through the drive line corresponding to that word, drive lines of other words remaining unenergized. Thus, cores storing digits or bits of unselected words receive no select current at all during reading.

However, to permit writing into each of the cores of a selected word in an array using such a direct selection reading system, it is necessary to revert to a coincident-current arrangement in which an "enable" coil or line is passed in series through magnetic cores corresponding to like digit or bit positions of each word in the array; that is, a first enable line passes in series only through those cores corresponding to the first bit or digit position of each word in the array, a second enable line passes in series only through the cores corresponding to the second bit or digit position of each word in the array, and so on, one enable line being provided for each corresponding bit or digit position of the words in the array. To write into the cores of a selected word, a typical coincident-current arrangement is then employed in which the drive lines passing through the cores of each word and the enable lines passing through corresponding bit or digit positions of the words in the array may be used as row and column drive lines, as in a conventional coincident-current selection system. A "1" or "0" may then be written into each core of a selected word by applying half select current to the drive line corresponding to the selected word in the array and simultaneously applying half select current only to those enable lines corresponding to bit or digit positions in which a "1" is to be written.

In the type of direct selection system just described, the decoder and drive circuitry required therefor will necessarily be more complex, since in such a system part of the burden of selection is shifted from the array to external circuitry. However, the system offers significant advantages in that, because only selected cores are disturbed during the reading operation, there will be no partially selected cores to induce unwanted signals or noise into the sense lines (which may be provided for each bit position in a manner similar to the enable lines). The noise problem, therefore, will be substantially eliminated.

Also, since only those cores which are to be read out are energized during the reading operation, the number of cores driven in series is greatly reduced and a large reading drive current may be employed to speed up the reading operation and definitely assure that sufficient current will be available to read out of the cores under all operating conditions. However, since coincident-current selection employing half select currents is used for writing, a ratio of only 2 to 1 between selected and unselected cores still has to be reckoned with and, as in a conventional coincident-current selection system, will require a careful choice of magnetic elements and drive circuitry. Further, because the reading and writing operations are not uniform (that is, currents of different magnitude as well as direction are required for the drive and enable lines during reading and writing), the drive and enable circuitry becomes accordingly more complex, since the nonuniformity of operation required thereof makes standardization most difficult and the use of the same circuitry during reading and writing becomes impractical, if not impossible.

A novel type of selection system which improves over the basic type of direct selection system described above is disclosed in the commonly assigned, co-pending patent application, Serial No. 796,892, filed March 3, 1959, and now U.S. Patent No. 3,134,965 in the name of Donal A. Meier, for a "Magnetic Data-Storage Device and Matrix," this novel selection system being described most particularly on pages 25–28 thereof. In this version of a direct selection system, thin-film rod-type magnetic elements are employed in the array, but obviously, conventional types of magnetic cores may also be used. Also, drive lines and enable lines are employed in a manner similar to the direct selection system described above. In addition, a bias line is employed to provide $\frac{1}{3}$ read select current bias for all the magnetic elements of the array. During reading a $\frac{2}{3}$ read select current is passed through a selected drive line which contains only those magnetic elements constituting the word whose digits are to be read out of the array in parallel, all other drive lines in the array remaining unenergized. Thus, the magnetic elements of a word to be read out of the array receive full select current ($\frac{2}{3}$ read select current from the drive line plus $\frac{1}{3}$ read select bias current), while the remaining cores of other words in the array receive only the $\frac{1}{3}$ read select current bias. A 3 to 1 ratio between the currents applied to selected and unselected magnetic elements is thereby achieved during the reading operation.

During writing, a $\frac{2}{3}$ write select current is passed through the drive line containing the magnetic elements of the word in the array whose digits are to be written into, all other drive lines remaining unenergized. Simultaneously, $\frac{2}{3}$ write select current is passed only through those enable lines which are coupled to magnetic elements of the word into which a "1" is to be written. Each magnetic element of the selected word whose enable line is so energized thereby receives a $\frac{2}{3}$ write select current from its enable line to overcome the $\frac{1}{3}$ read select bias and provide a resultant drive of $\frac{1}{3}$ write select current, which adds to the $\frac{2}{3}$ write select current from the drive line to provide the full (or $\frac{3}{3}$) write select current required to switch the magnetic element to the "1" state. If a "0" is to be written into a magnetic element of the selected word, the enable line corresponding thereto is not energized so that the $\frac{1}{3}$ read select bias current subtracts from the $\frac{2}{3}$ write select current in its drive line to provide a resultant drive of only $\frac{1}{3}$ write select current, which is insufficient to change the state of the element, and the element remains in its "0" state.

From the above description of the novel selection system disclosed in the aforementioned patent application, it will be apparent that a system is achieved in which the ratio between the currents through selected and unselected magnetic elements is 3 to 1 for both reading and writing operations, as compared with the 2 to 1 ratio obtained in a coincident-current selection system. Thus, the novel selection system of the aforementioned co-pending patent application is significantly superior to that of the first described direct selection system with regard to the important problem of tolerances in the magnetic elements and drive circuitry, since a 3 to 1 ratio between currents through selected and unselected magnetic elements is achieved during both reading and writing, while the first system provides a ratio of only 2 to 1 during writing. Also, increased uniformity is possible in the novel system of the aforementioned co-pending patent application, because the current through the drive line of the selected word will be the same (except for direction) during both reading and writing. And, because of the 3 to 1 ratio between currents flowing through selected and unselected elements, noise resulting from $\frac{1}{3}$ partially selected elements will still be very much smaller than in a coincident-current selection system.

While both versions of a direct selection system described above offer important advantages over a coincident-current selection system, these advantages are realized only at the expense of inherently larger decoding and driving circuitry made necessary because some of the burden of selection is shifted from the magnetic element array to external circuitry. Thus, although a direct selection system offers many advantages over a coincident-current selection system as indicated above, the inherently more complicated drive and decoder circuitry required thereby limits its use to applications where extreme reliability is required, or where a widely varying operating environment is involved, or where the more complicated drive and decoder circuitry required is not prohibitive.

Because of the superiority of performance of a direct selection system over a coincident-current selection system, such as the version described in the aforementioned co-pending patent application, it would be most advantageous to be able to provide a system which retains the high ratio between drive currents applied to selected and unselected magnetic elements, while at the same time significantly decreasing the required complexity of the external circuitry, particularly the number of drivers and drive lines required for an array of magnetic elements of a given word capacity. In accordance with the present invention this result is advantageously achieved using a magnetic data-storage system which combines the economy of coincident-current selection with the advantages of direct selection to provide a resulting system which retains many of the advantages of both systems but eliminates the severe disadvantages of both.

Briefly, the magnetic data-storage system of the present invention may be similar to the basic functional arrangement disclosed in the aforementioned commonly assigned co-pending patent application, but with important changes in circuitry and mode of operation, whereby the enable lines are not only employed during writing as in prior art systems, but by the addition of relatively simple decoder circuitry therefor, serve to significantly reduce the burden of decoding required for the read and write drive lines. In particular, an important feature of the present invention is the provision of a magnetic element array having a plurality of words on each row thereof, which operates in combination with decoder circuitry provided for both the drive and enable lines of the array, to permit one of the plurality of words on the selected row to be accessed for reading and writing while the other words on the row remain essentially undisturbed. A very substantial savings in decoder and drive circuitry is thereby made possible, and at the same time, by means of the present invention, the high 3 to 1 ratio between the coercive effect applied to selected and unselected magnetic elements in the array is maintained for both reading and writing operations. For example, if four words are provided on a single row, the number of drive lines and associated decoder and drive circuitry is reduced by one-fourth, and only a relatively small proportionate increase in enable logic and decoder circuitry is required. It will thus be appreciated that, because the present invention achieves many of the important features of a direct selection system at a great savings in circuitry, it thereby becomes possible to extend the advantages heretofore obtainable only by means of a complicated and expensive direct selection system to applications even where economy of decoder and drive circuitry is an important objective. In fact, considering the measures which must be taken to insure high reliability in a coincident-current selection system in a widely varying environment, the system of the present invention may in some cases actually provide greater economy of circuitry for such an environment, in addition to providing the important advantages of increased reliability, less noise, and greater efficiency of operation.

Also, in accordance with the present invention, improved decoding and driving means are provided incorporating a plurality of magnetic decoder cores and transistor drive circuitry in a novel manner which achieves high reliability switch core decoding, while at the same time permitting the location of an address in the magnetic element array to be conveniently retained throughout the memory cycle, even though other circuitry (such as an address register) is changed in preparation for the next read-write memory cycle.

It is, therefore, an object of this invention to provide a novel data-storage system of the character hereinbefore briefly described.

Another object of the invention is to provide an improved data-storage system offering significant advantages over prior art systems.

Still another object of this invention is to provide an improved method of operating a magnetic element array.

Yet another object of the invention is to provide a data-storage system which provides high reliability, high efficiency, and low noise operation with a minimum of external decoding and driving circuitry.

A further object of this invention is to provide an improved data-storage system including a magnetic element array, in which the ratio between currents applied to selected and unselected magnetic elements in the array is at least 3 to 1 during both reading and writing operations.

A still further object of this invention is to provide a magnetic data-storage system including a magnetic element array having a plurality of words on each row thereof, and decoder and drive circuitry operating in cooperation therewith for selecting one of the plurality of words on a given row, while other words on the row as well as all other words in the array remain essentially undisturbed.

Another object of the invention is to provide an improved magnetic decoder core arrangement operating in cooperation with read and write transistor drive circuitry for selecting a predetermined plurality of elements in a magnetic element array.

Another object of the invention is to provide an improved method for addressing and decoding data stored in a magnetic element array.

Another object of this invention is to provide an improved enable driver for applying current to selected enable lines of a magnetic element array.

Other objects, uses, and advantages of the invention will become apparent from the following description and the accompanying drawings in which:

FIG. 1 is a block diagram of a typical embodiment of a data-storage system in accordance with the invention;

FIG. 1a is a block diagram illustrating the generation of timing pulses for the system of FIG. 1;

FIG. 2 is a schematic diagram of a portion of the memory core array 150 of FIG. 1 illustrating how a particular bit or digit of a selected word is read out, and written into, while correspondingly positioned cores of unselected words on the same row are inhibited from reading and writing;

FIG. 3 is a schematic diagram of a portion of the memory core array 150 of FIG. 1 illustrating how a typical sense winding may be provided to permit reading out of a core of a selected word in the array;

FIG. 4 is a series of graphs illustrating typical timing relationships in the data-storage system of FIG. 1;

FIG. 6 is a graph of a typical hysteresis loop of a decoder core 35 of the preferred decoder 25 of FIG. 5, which will be used in illustrating the operation thereof;

FIG. 7 is a block and circuit diagram illustrating in detail how the specific embodiment of the decoder of FIG. 5 is employed in the system of FIG. 1;

FIG. 8 is a series of graphs illustrating timing relations which will be used in explaining the embodiment of FIG. 7;

FIG. 10 is a circuit and block diagram illustrating the construction and arrangement of a typical enable driver employed in the system of FIG. 1.

Like numerals denote like elements throughout the figures of the drawing.

Figure 5:
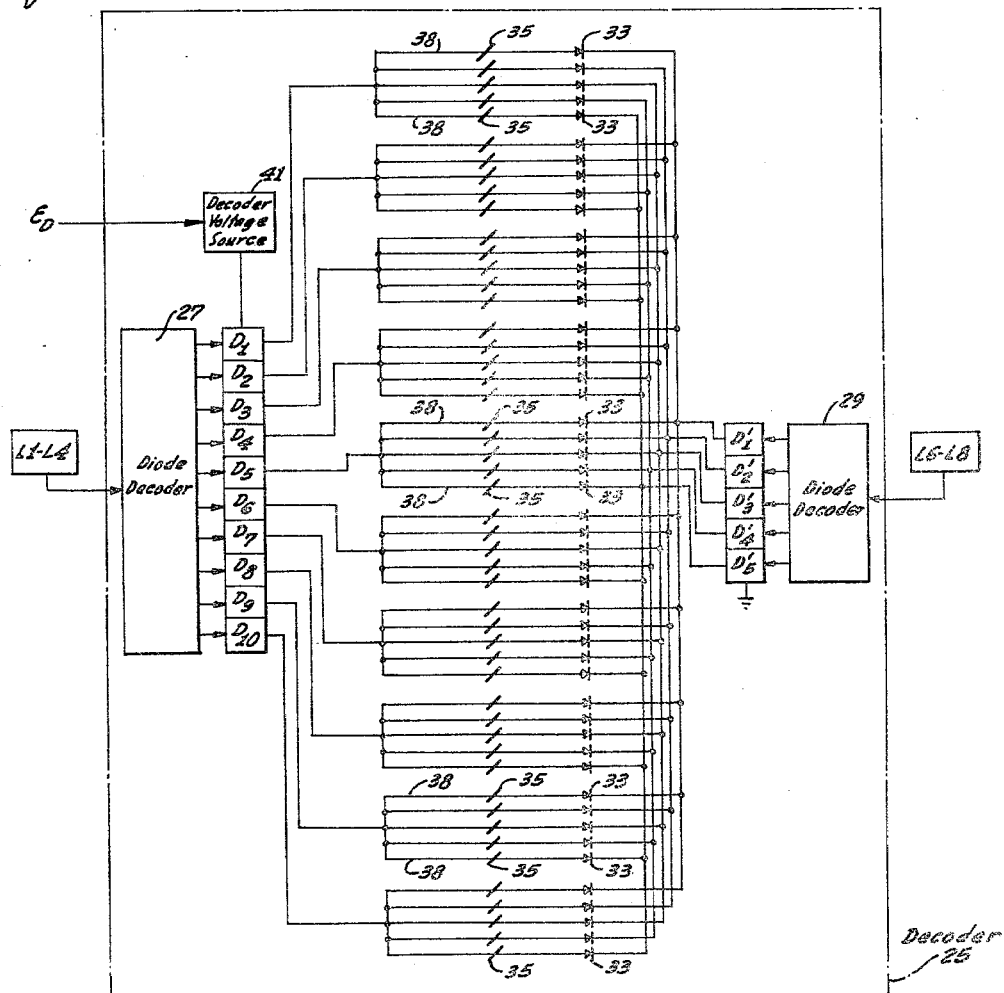
FIG. 5 is a block and circuit diagram of a preferred embodiment of the decorder 25 illustrated in block form in the system of FIG. 1.

*Memory core array 150 of FIG. 1 and mode of operation thereof*

Referring now to FIG. 1, which is a block diagram of a typical magnetic data-storage system in accordance with the invention, a memory core array 150 is provided along with associated decoding and driving circuitry therefor. The memory core array 150 may typically comprise 130,000 ferrite cores arranged in 2500 rows of 52 cores each. Each of the 2500 rows includes one read drive line and one write drive line passing through all the 52 cores in the row, so that one pair of read-write drive lines is provided for each of the 2500 rows in the array 150. The 52 cores on each row constitute four 12-bit words (a core serving as one bit) and an additional 13th core is provided for each word as a parity or check bit. A total capacity of ten thousand 12-bit words plus a check bit for each word is thus provided by the illustrative array 150 of FIG. 1.

It will be noted that the cores in the memory array 150, such as the core 15 in the upper left-hand corner of the array, are schematically illustrated as resting on their edge, but it is to be understood that this is merely for convenience of illustration and any other desired mounting arrangement may be employed therefor. Also, it is to be understood that other magnetic storage elements may be used instead of ferrite cores, such as the thin film rod-type magnetic elements disclosed in the aforementioned commonly assigned patent application, S.N. 796,-892. It will further be noted that only a single line is shown passing through a core corresponding to a particular winding thereof. While such a single line ordinarily represents a one-turn winding, it will be understood that windings with more than one turn may be provided for each core if so desired, and for the purposes of this description, such lines passing through a core in the various figures of the drawing will be considered to represent any desired number of turns as may be necessary to achieve the performance required thereof.

The 2500 rows of cores of the memory core array 150 are conveniently divided into 50 groups of 50 rows each, the groups being designated as $G_1$, $G_2$ . . . $G_{50}$ as shown in FIG. 1. The 50 rows of each group are designated by the letter G with the first subscript indicating the group and the second subscript indicating the number of the particular row in the group. Thus, the designation $G_{1-1}$ refers to the first row in the first group of 50 rows $G_1$, the designation $G_{2-1}$ refers to the first row in the second group of 50 rows $G_2$, the designation $G_{50-50}$ refers to the fiftieth row in the fiftieth group of 50 rows $G_{50}$, and so on, as indicated in FIG. 1. Each row includes one read drive line and one write drive line which, as shown in FIG. 1, are given the same subscript designation as the row except that the letter R is used for a read drive line and the letter W is used for a write drive line. For example, $R_{1-50}$ and $W_{1-50}$ would represent respectively the read and write drive lines of the fiftieth row $G_{1-50}$ in the first group of 50 rows $G_1$.

As shown in FIG. 1, the 52 cores of the groups $G_1$–$G_{50}$ are divided into 13 sections, each section representing one of the 13 bit positions $B_1$–$B_{13}$ of the four words on each row of the group, each section being designated by its respective group number and bit position. For example, the designation $G_1B_1$ represents the first bit position section $B_1$ of the first group $G_1$, the designation $G_{50}B_{13}$ represents the thirteenth bit position section $B_{13}$ of the fiftieth group $G_{50}$, and so on. Each bit position section includes those four cores in each row which respectively correspond to the same predetermined bit position of each of the four words making up the row. For example, considering the fiftieth row $G_{1-50}$ in the first group $G_1$ of the array 150, the four cores 15, 15′, 15″, and 15‴ in bit position section $G_1B_1$ store respectively the first bit of each of the first, second, third, and fourth words in row $G_{1-50}$; that is, the core 15 stores the first bit of the first word on row $G_{1-50}$, the core 15′ stores the first bit of the second word on row $G_{1-50}$, the core 15″ stores the first bit of the third word on row $G_{1-50}$, and the core 15‴ stores the first bit of the fourth word on row $G_{1-50}$. As indicated in FIG. 1 there are 13 such bit position sections which may be arranged in a like manner, the first 12 bit position sections $B_1$–$B_{12}$ respectively storing the 12 bits of each of the four words on a given row, as illustrated for row $G_{1-50}$ of the section $G_1B_1$, and the 13th bit position section $B_{13}$ storing the parity or check bit corresponding to each of the four words in the row.

In addition to the 2500 pairs of read and write drive lines $R_{1-1}$–$R_{50-50}$ and $W_{1-1}$–$W_{50-50}$ which pass through° respective rows of the array 150, 52 enable lines are also provided passing through respective columns of cores in the array, one enable line passing through each of the 52 columns of cores, such as illustrated by enable lines 14 and 17 in FIG. 1. Specifically, each enable line passes through a column of cores storing corresponding bits in the four words on each row of the array. For example: the enable line 14 in FIG. 1 passes through the first column of cores in the array 150, each core in the first column storing the first bit of the first word on its respective row; the enable line 17 passes through the second column of cores in the array, each core in the second column storing the first bit of the second word in its respective row; and so on, until the enable line 19 is reached which passes through the last or 52nd column of cores in the array 150, each core in the last column storing the thirteenth or check bit of the fourth word of its respective row.

The mode of operation of the memory array 150 of FIG. 1, by means of which reading out of or writing into the cores of a selected one of the 10,000 words in the array is accomplished, will now be explained using the schematic diagram of FIG. 2, which illustrates the first bit position section $G_1B_1$ of the first group $G_1$. The mode of operation for only one bit position section of a typical group is illustrated in FIG. 2, but it is to be understood that the operation for the other bit positions of the group may be identical, and operation at all bit positions $B_1$–$B_{13}$ may advantageously be accomplished simultaneously.

For purposes of this explanation it will be assumed that the cores of the particular word selected to be read out of and written into the array 150 of FIG. 1 is the first word of the fiftieth row $G_{-150}$ of group $G_1$. The particular core in illustrative bit position section $G_1B_1$ of FIG. 2, selected to be read out and written into is thus core 15, which stores the first bit of the selected word. For purposes of clarity the solid arrows in FIG. 2 have been used to represent the flow of current in the enable and read drive lines during reading out from core 15, while the dotted arrows have been used to represent the flow of current in the enable and write drive lines during writing into core 15.

First, considering the reading operation and the solid arrows in FIG. 2, it will be seen that a current of $2I/3$ (where $I$ is equal to full read select current) is caused to flow only through read drive line $R_{1-50}$ of row $G_{1-50}$ containing the selected word, the write drive line of row $G_{1-50}$ and both the read and write drive lines of all other rows in the array 150 receiving no current. Also, simultaneously with the application of the current of $2I/3$ to the read drive line $R_{1-50}$ of row $G_{1-50}$, a current of $I/3$ is caused to flow in enable line 14, which passes through the first bit position cores of the first word in each row, and thus through core 15 of the selected word, while a current $-I/3$ (the minus sign indicating current in the opposite or write direction) is caused to flow in each of the enable lines passing through the first bit positions cores of the second, third, and fourth words in each row, and thus through the respective first bit position cores 15′, 15″, and 15‴ of the three unselected words on row $G_{1-50}$. As a result, first bit position core 15 of the selected word on row $G_{1-50}$ receives a current of $2I/3$ from its read drive line $R_{1-50}$ plus another $I/3$ from its enable line 14 to provide a total current equal to $3I/3$, or full read select current $I$, which causes the core 15 to switch from the "1" to the "0" state if the core 15 stores a "1," or to remain in the "0" state if the core 15 stores a "0."

The other first bit position cores 15′, 15″, and 15‴ on row $G_{1-50}$ also receive a current of $2I/3$ from the read drive line $R_{1-50}$, but the current of $-I/3$ flowing in their respective enable lines subtracts from the $2I/3$ current in the read drive line $R_{1-50}$, resulting in an effective current applied to these cores of only $I/3$ or 1/3 read select current, which is clearly insufficient to cause switching. The stored bits in these unselected cores 15′, 15″, and 15‴ on row $G_{1-1}$ will thus remain essentially undisturbed. Also, since a current of only $I/3$ or $-I/3$ flows in the enable lines, the maximum current in any core not on row $G_{1-1}$ will be $I/3$ or $-I/3$ as a result of enable line current flowing therethrough, which again is clearly insufficient to provide switching.

The above operation illustrated for cores 15, 15′, 15″, and 15‴ of bit position $B_1$ of row $G_{1-50}$ occurs simultaneously for all the other bit positions $B_{2-13}$. Consequently, during the reading operation, only the cores of the selected one of four words on the selected row $G_{1-50}$ receive full read select current, while cores of unselected words on row $G_{1-1}$ receive only 1/3 select current as do all the other cores of the array 150. It should be apparent, therefore, that during the reading operation, the desired high ratio of 3 to 1 between currents applied to selected and unselected cores is achieved.

Since only one core in each of the 13 bits positions in the array is capable of receiving full read select current during the reading operation, only one sense line need be provided for each bit position in order to permit the data stored in the selected core of that bit position to be read out of the array 150. No sense lines are shown in the array 150 of FIG. 1 or in FIG. 2 for purposes of clarity; however, a typical sense line is diagrammatically illustrated in FIG. 3 for bit position 1 of groups $G_1$ and $G_2$, and in FIG. 3 it is the read and write drive lines which are now omitted for purposes of clairty. As will be evident from FIG. 3, the sense line passes in series through all the cores in the array located in the bit position corresponding thereto, and following the usual practice, the signal induced in the sense line when a core is switched from "1" to "0" is used to indicate that a "1" was stored in the selected core. A sense amplifier is provided for each sense line in a conventional manner, such as generally illustrated in FIG. 3 by the block $S_1$ for the bit 1 sense amplifier.

Considering the sense line further, it will be appreciated by those skilled in the art, that it is most desirable for the sense line to be wound cancelling so that noise from partially selected cores cancel out as far as possible. One such winding arrangement is shown in FIG. 3 in which the sense line is wound through the cores in each group, such as illustrated for groups $G_1$ and $G_2$, so that for any four cores on a given row in the same bit position, the sense line passes in the same direction through two of the cores and in the opposite direction through the other two cores. Thus, noise or unwanted signals induced in the sense line from 1/3 partially selected cores on the same row as the selected cores will produce an effect in the sense line which is no greater than that obtained from a single one of the 1/3 partially selected cores, since the signals induced in two of the three partially selected cores will always cancel each other out.

Also, as indicated in FIG. 3 for bit position 1, each bit position sense line is wound in one direction with respect to the enable lines in odd numbered groups ($G_1$, $G_3$, $G_5$, $G_7$ ... $G_{49}$), and in the other direction with respect to the enable lines in even numbered groups ($G_2$, $G_4$, $G_6$, $G_8$ ... $G_{50}$). By such a procedure, the effects of 1/3 partially selected cores on rows other than the row of selected word (resulting from the flow of $I/3$ or $-I/3$ enable current in each enable line) will be cancelled out, since the signals induced in the sense lines from 1/3 partially selected cores in odd numbered groups will be approximately cancelled out by opposite polarity signals induced in the sense line from 1/3 partially selected cores in even numbered groups. Obviously, other sense line winding arrangements could be employed besides that illustrated in FIG. 3, and the invention is not to be considered as being limited to any particular sense winding arrangement.

As shown in FIG. 1, 13 sense amplifiers $S_1$–$S_{13}$ are provided, one for each of the 13 bit position sense lines. The sense amplifiers $S_1$–$S_{13}$ are constructed in any of a numbered of well known forms to amplify sense signals of either polarity received from their respective sense lines, while providing amplified output signals of the same polarity, regardless of the input polarity of the sense line signals. This type of sense amplifier is desirable, because in the sense winding arrangement employed, a signal induced in a sense line during read out in response to the presence of a "1" in the selected bit position core may be of either polarity.

Referring again to FIG. 1, it will be seen that the 13 sense amplifiers $S_1$–$S_{13}$ feed respective ones of 13 gates $P_1$–$P_{13}$, which in turn feed respective ones of 13 memory register flip-flops M1–M13. A strobe timing pulse $E_S$ (FIG. 1a) triggers a strobe generator 25 (FIG. 1) which opens the gates $P_1$–$P_{13}$ for a predetermined time during the read portion of the memory cycle to permit the 13 bits of a selected word, represented by the absence or presence of output signals at the outputs of each of the 13 sense amplifiers, to be stored in respective ones of the 13 memory register flip-flops M1–M13. The arrow feeding the memory register flip-flops M1–M13 represents any type of well known means for clearing or setting which may be provided in accordance with the operation of a computer.

Now, returning to FIG. 2, it will be explained how binary data (that is, either a "1" or a "0") can be written into first bit position core 15, which was read out during the reading operation (and is thus now in the "0" state) while cores of unselected words again remain essentially undisturbed. Referring to the dotted arrows in FIG. 2, which represent current flowing during the writing operation, it will be seen that a current of $-2I/3$ (that is, 2/3 write select current) is caused to flow only through write drive line $W_{1-50}$ of row $G_{1-50}$ containing the selected words; the read drive line $R_{1-50}$ of row $G_{1-50}$ and both the read and write drive lines of other rows in the array 150 receive no current. If a "1" is to be written into core 15, a current of $-I/3$ is simultaneously caused to flow in enable line 14 passing therethrough, so as to add to the current of $-2I/3$ in the write drive line $W_{1-50}$ of row $G_{1-50}$, and thereby provide the full write select current required to switch core 15 to the "1" state. However, if a "0" is to be written into core 15, a current in the opposite direction, or $I/3$, is caused to flow in enable line 14 which subtracts from the current of $-2I/3$ in write drive line $W_{1-50}$ to provide a resultant current of only $-I/3$, thereby maintaining core 15 in the "0" state it was left in after read-out therefrom.

Similar to that provided for core 15 if a "0" is to be stored therein, the other first bit position cores 15', 15", and 15''', corresponding to the three unselected words on row $G_{1-50}$, each receive a current of $I/3$ from their respective enable line, which subtracts from the current of $-2I/3$ in write drive line $W_{1-50}$ to provide a resultant current applied to each unselected core of only $-I/3$, so that these cores 15', 15", and 15''' remain essentially undisturbed. It will be seen, therefore, that during the write portion of the cycle the cores 15', 15", and 15''' of the unselected words are fed the same enable current as core 15 of the selected word where a "0" is to be written therein. However, the result is different in that core 15 remains in the "0" state in which it was left after read-out therefrom, while unselected cores 15', 15", and 15''' remain undisturbed with whatever bits are stored therein, since these unselected cores were not read out from during the reading operation.

In the same manner as described above for bit position $B_1$, operation in each of the other 12 bit positions $B_2$–$B_{13}$ on the selected row $G_{1-50}$ is such that during the write portion of the cycle only the core corresponding to the selected word on the row in which a "1" is to be written receives a current of $-I/3$ to add to the current of $-2I/3$ in the write drive line $W_{1-50}$ and thereby switch the core from the "0" to "1" state. All other cores on the selected row receive a current of $I/3$ which subtracts from the write drive line current of $-2I/3$ to provide a resultant applied current of only $-I/3$, thereby effectively maintaining in the "0" state those cores of the selected word in which a "0" is to be written, while at the same time maintaining the cores of unselected words on the selected row essentially undisturbed. Also, as was the case during the reading operation, only 1/3 select current flows in the cores in the array 150 which are not on the selected row $G_{1-50}$ as a result of a current of either $I/3$ or $-I/3$ flowing in each enable line. Thus, as during the reading operation, the desired high ratio of 3 to 1 between currents applied to selected and unselected cores is again achieved during the writing operation.

It will be noted in the mode of operation of the array just described, that the same magnitude enable current ($I/3$ or $-I/3$) and the same magnitude drive current ($2I/3$ or $-2I/3$) flows during both reading and writing operations, which is most desirable from a uniformity standpoint as previously pointed out herein.

However, the most important advantage which has been achieved by the array 150 and the mode of operation thereof just described is that the number of rows required to be selected for this 10,000 word array is only one-fourth or 2500 rows as compared to the 10,000 rows which are required to be selected in other types of direct selection systems with equivalent word capacity, such as were briefly described previously. As will hereinafter become evident when a typical embodiment of row selection drive circuitry is described, this very substantial reduction in the number of rows required to be selected makes possible a corresponding reduction in the decoder and drive circuitry required for the array, thereby making possible substantial savings both in the size and expense of a data-storage system in which this mode of operation is employed. And yet, these savings are realized while maintaining the desired high ratio of 3 to 1 between currents applied to selected and unselected cores in the array during both reading and writing operations.

Of course, while the number of rows required is reduced in accordance with the number of words on each row, it will be noted that additional enable lines and drive circuitry will be required for the three additional words on each row (as compared to one word on each row in related prior art systems). Also, since part of the decoding has been shifted from the read and write lines of the rows to the enable lines, additional enable decoder circuitry will be required for selecting the direction of flow of the 1/3 select current in the 52 enable lines so as to permit the desired one of four words on a given row to be accessed. However, as will hereinafter become apparent, this additional circuitry required is quite small when compared to the relatively greater drive and decoder circuitry required in related prior art direct selection systems. For example, in the array 150 of FIG. 1, an additional 39 enable lines are required instead of 13 as would be required in an equivalent prior art direct selection system having only one word on each row, but only 2500 rows are required to be selected in the array 150 as compared to 10,000 rows in the equivalent prior art system, a savings of 7500 rows; and inherently, an additional row requires more complex external circuitry than an additional enable line.

It will be appreciated by those skilled in the art that the invention is not limited to the use of four words on each row as illustrated in the array 150 of FIG. 1, and any other convenient plurality of words may be employed. Also, the particular physical arrangement of the cores in the array 150 is only illustrative, and any other physical arrangement could be employed which provides equivalent functional performance. It is to be understood, therefore, that it is the functional arrangement of the elements so as to be driven in rows and columns which is important, and not the physical row-column arrangement, since physically the elements may be arranged in a wide variety of forms.

Still further, it will be appreciated that a single dual purpose drive line could be employed in place of the separate read and write drive lines provided for each row of the array 150, in which case 2/3 select current would flow therethrough in one direction for reading, and in the opposite direction for writing. In the specific embodiment of the present invention it has been found more convenient in view of the drive circuitry employed therewith to use two drive lines, one for reading and one for writing, but by suitable choice of drive circuitry, a single drive line could be used if so desired.

*Selection of a particular one of the 2500 rows in the in the array 150 of FIG. 1*

Referring to the block diagram of FIG. 1, it will first be explained how a particular one of the 2500 rows in the array 150, namely row $G_{1-50}$ of group $G_1$, is selected whereby currents of $2I/3$ and $-2I/3$ are caused to flow in the read and write drive lines thereof during respective read and write portions of a memory cycle. Since 2/3 select current is to be applied only to the drive lines of the selected row, while drive lines of other rows in the array will receive no current, such a mode of operation as far as the rows are concerned is a form of direct selection.

A particularly desirable form of direct selection of the 2500 rows in the array, commonly referred to as linear selection, is illustrated in the block diagram of FIG. 1. In such an arrangement a first group of 50 read drivers $R_1$–$R_{50}$ is provided on the left side of the array 150 in FIG. 1, the output of each of the read drivers $R_1$–$R_{50}$ being connected to the left ends of the 50 drive lines of the group of 50 groups $G_1$–$G_{50}$ in the array having the same subscript. For example, the output of read driver $R_1$ is connected to the left ends of the 50 read drive lines $R_{1-1}$–$R_{1-50}$ of group $G_1$, the output of read driver $R_2$ is connected to the left ends of the 50 read drive lines $R_{2-1}$–$R_{2-50}$ of group $G_2$, and so on, to the fiftieth read driver $R_{50}$ whose output is connecetd to the left ends of the 50 read drive lines $R_{50-1}$–$R_{50-50}$ of group 50.

At the right side of the array 150 in FIG. 1, a second group of 50 read drivers $R'_1$–$R'_{50}$ is provided, the output of each of these read drivers $R'_1$–$R'_{50}$ being connected to the right ends of the 50 correspondingly positioned read drives lines in the groups $G_1$–$G_{50}$ of the array through a respective diode 23 in each read drive line poled in the direction of flow of read current, the diodes 23 being provided to prevent the flow of "sneak" currents as will hereinafter be described. For example, the output of read driver $R'_1$ is connected through a diode 23 to the right end of the first read drive line in each group, (that is, $R_{1-1}$, $R_{2-1}$, . . . $R_{50-1}$), the output of read driver $R'_2$ is connected through a diode 23 to the right end of the second read drive line in each group (that is, $R_{1-2}$, $R_{2-2}$ . . . $R_{50-2}$), and so on, to the fiftieth read driver $R'_{50}$ whose output is connected through a diode 23 to the right end of the fiftieth read drive line in the fiftieth row of each group (that is, $R_{1-50}$, $R_{2-50}$ . . . $R_{50-50}$).

In a similar manner to that just described for read drivers $R_1$–$R_{50}$ and $R'_1$–$R'_{50}$, write drivers $W_1$–$W_{50}$ and $W'_1$–$W'_{50}$ are provided respectively connected to opposite ends of the write drive lines $W_{1-1}$–$W_{50-50}$ in the array 150; that is, each of the write drivers $W_1$–$W_{50}$ at the left side of the array is connected to the left ends of the 50 write drive lines of the group having the same subscript, while each of the write drivers $W'_1$–$W'_{50}$ at the right side of the array is connected to the right end of the 50 correspondingly positioned write drive lines in the group of the array. And for the same reason as provided for the read drive lines, a diode 13 poled in the direction of write current flow is interposed in each write drive line to prevent current flow from "sneak" paths. Obviously, the diodes 23 and 13 could be interposed at either end of their respective read and write drive lines and are shown at opposite ends in FIG. 1 merely for convenience.

A decoder 25 at the left side of the array 150 in FIG. 1, in response to a decoder timing pulse $E_D$ and in accordance with the settings of seven address register flip-flops L1–L4 and L6–L8 applied thereto, activates one of the 50 read drivers $R_1$–$R_{50}$ during the read portion of a memory cycle, and a corresponding one of the 50 write drivers $W_1$–$W_{50}$ during the write portion of a memory cycle. In a like manner, a decoder 125 at the right side of the array, in response to the decoder timing pulse $E_D$ and in accordance with the settings of another seven address register flip-flops L10–L12 and L13–L16, activates one of the 50 read drivers $R'_1$–$R'_{50}$ during the read portion of a memory cycle, and a corresponding one of the 50 write drivers $W'_1$–$W'_{50}$ during the write portion of a memory cycle. A decoder timing pulse $E_D$ applied to the decoders 25 and 125 triggers the operation of these decoders whereby corresponding read and write drivers are activated by each decoder in accordance with the settings of the address register flip-flops applied thereto. Also, the arrows shown feeding the address register flip-flop are intended to generally designate any of a number of well known means in a computer which may be employed for setting and clearing each address register flip-flop.

A read current source 22 having a read dummy 20 connected thereacross feeds the read drivers $R_1$–$R_{50}$, and in a like manner, a write current source 28 having a write dummy 30 connected thereacross feeds the write drivers $W_1$–$W_{50}$. The read and write dummies 20 and 30 effectively serve to short out their respective read and write current sources 22 and 28 in the absence of read and write timing pulses $E_{RD}$ and $E_{WD}$ respectively applied thereto. When a read dummy timing pulse is applied to the read dummy 20 during the read portion of the memory cycle, the read current source 22 is unshorted, permitting $2I/3$ (that is, 2/3 read select current) to flow to the selected one of the 50 read drivers $R_1$–$R_{50}$ which has been activated by the decoder 25. Similarly, when a write dummy timing pulse $E_{WD}$ is applied to the write dummy 30 during the write portion of the memory cycle, the write current source 28 is unshorted, permitting a current of $-2I/3$ (that is, 2/3 write select current) to flow to the selected one of 50 write drivers $W'_1$–$W'_{50}$ which has been activated by the decoder 125.

Now assuming that the one word of the array to be accessed is on row $G_{1-50}$, the address register flip-flops L1–L4 and L6–L8 feeding the decoder 25 and the address register flip-flops L10–L12 and L13–L16 feeding the decoder 125 would be set so that during the read portion of the memory cycle decoder 25 activates read driver $R_1$ and decoder 125 activates read driver $R'_{50}$. Since read driver $R_1$ connects the left end of all the read drive lines in group $G_1$, namely $R_{1-1}$, $R_{1-2}$ . . . $R_{1-50}$, and read driver $R'_{50}$ connects, through a diode 23 in each line, the right end of the fiftieth read drive line in each group, namely, $R_{1-50}$, $R_{2-50}$ . . . $R_{50-50}$, the only one of the 2500 read drive lines in the array having read drivers activated at both ends thereof will be read drive line $R_{1-50}$ of row $G_{1-50}$. Thus, when the read dummy timing pulse $E_{RD}$ is applied to the read dummy 20 during the read portion of the memory cycle, the read current source 22 is unshorted, permitting 2/3 read select current to flow from the read current source 22 through the selected read drive line $R_{1-50}$ by way of the activated read drivers $R_1$ and $R'_{50}$ at both ends thereof.

In a like manner, during the write portion of the memory cycle, write drivers $W_1$ and $W'_{50}$, corresponding to read drivers $R_1$ and $R'_{50}$, would be activated by decoders 25 and 125, respectively. Then, when the write dummy timing pulse $E_{WD}$ is applied to the write dummy 30 during the write portion of the memory cycle, the write current source 28 is unshorted, permitting 2/3 write select current to flow from the write current source 28 through the selected write drive line $W_{1-50}$ by way of the activated write drivers $W_1$ and $W'_{50}$.

One of the important advantages of the linear selection arrangement employed in FIG. 1 to select one of the 2500 rows in the array 150 is that only 50 x 50 or 100 drivers are necessary to decode 2500 drive lines. That is, only 100 read drivers ($R_1$–$R_{50}$ and $R'_1$–$R'_{50}$) are required to select the desired one of 2500 read drive lines, and only 100 write drivers ($W_1$–$W_{50}$ and $W'_1$–$W'_{50}$) are required to select the desired one of 2500 write drive lines. However, this type of linear selection arrangement has the disadvantage that many parallel paths exist by means of which "sneak" currents could flow in unselected drive lines unless a diode such as illustrated by diodes 13 and 23 were employed in each read and write drive line to eliminate this possibility. If the diodes 13 and 23 were absent and read drivers $R_1$ and $R'_{50}$ were activated to select read drive line $R_{1-50}$, it will be seen that other paths of current flow through unselected drive lines would also exist, besides the direct path through the selected read drive line $R_{1-50}$. For example, one such path would comprise read drive line $R_{1-1}$, read drive line $R_{2-1}$, and read drive line $R_{2-50}$. By providing the diodes 13 and 23, as shown in FIG. 1, such a path would include the back resistance of at least one diode, namely diode 23 in read drive $R_{2-1}$.

Because many such parallel paths exist, it is important that each of the diodes 13 and 23 have a relatively high back resistance to maintain the cumulative effect of such parallel paths within tolerable limits. Diodes of this type, however, are costly and the requirement therefor is a significant expense in the cost of the system as well as increasing circuit complexity. Thus, it will be appreciated that the reduction made possible by the present invention in the number of rows required is a very significant advantage, since the provision of four words on each row instead of only one as in prior art systems, makes possible a reduction in the number of rows required from 10,000 rows in a prior art array of equivalent capacity to only 2500 rows in the present invention.

*Selection of the enable lines of the array 150 of FIG. 1*

Now that the selection of the row $G_{1-50}$ containing the word in the array to be accessed has been described, whereby 2/3 read and write select currents are caused to flow through the read and write drive lines $R_{1-50}$ and $W_{1-50}$ of the selected row $G_{1-50}$ during respective read and write portions of the memory cycle, it will next be explained how the 52 enable lines of the array 150 are selected and driven to permit the cores of the selected word on the selected row $G_{1-50}$ to receive full select current during reading and writing, while cores of unselected words on the selected row $G_{1-50}$ and other cores in the array receive only 1/3 select current, as was described previously in connection with FIG. 2.

Referring to FIG. 1, each of the 52 enable lines is provided with an enable driver which is capable of passing current therethrough equal to 1/3 select current in either one direction or the other. Thus, there will be 52 enable drivers corresponding to the 52 enable lines in the array 150, and these are divided into four groups of 13 each, designated as enable driver groups $E_1$, $E_2$, $E_3$, and $E_4$. Each of the four enable driver groups $E_1$–$E_4$ corresponds to one of the four words on each row of the array 150. That is, enable driver group $E_1$ drives the 13 enable lines passing through the 13 cores corresponding to the first word on each row of the array, enable driver group $E_2$ drives the 13 enable lines passing through the 13 cores corresponding to the second word on each row, enable driver group $E_3$ drives the 13 enable lines passing through the 13 cores corresponding to the third word on each row, and enable driver group $E_4$ drives the 13 enable lines passing through the 13 cores corresponding to the fourth word on each row.

Considering each individual enable driver, the first subscript thereof indicates the group, and thus the particular word on each row to which that enable driver belongs, and the second subscript thereof indicates the bit position of the word on each row whose corresponding enable line is driven thereby. For example, enable driver $E_{2-1}$ would be the enable driver which drives enable line 17 passing through the column of cores (including core 15″) corresponding to the first bit of the second word in each row. It will be noted that each enable driver has two output lines; one output line, such as indicated by 17, passes through the column of cores of the bit position of the word to which it corresponds, and the other line, such as indicated by 17′, serves as a return line.

Remembering the previous discussion of the mode of operation of the array 150 described in connection with FIG. 2, and again assuming that the first word on the selected row $G_{1-50}$ is the one to be accessed, the operation of the enable drivers will now be explained as follows. During the read portion of a memory cycle, enable drivers $E_{1-1}$–$E_{1-13}$ of enable driver group $E_1$, corresponding to the first word on row $G_{1-50}$, will supply 1/3 select current in a direction aiding the 2/3 read select current flowing in read drive line $R_{1-50}$ to permit the cores of the first word on row $G_{1-50}$ to be read out, and during the write portion of the memory cycle will supply 1/3 select current in a direction aiding the 2/3 write select current flowing in the write drive line $R_{1-50}$ in those cores of the first word in which a "1" is to be written, and 1/3 select current in the opposite direction in those cores of the first word in which a "0" is to be written. On the other hand, enable drivers $E_{2-1}$–$E_{2-13}$, $E_{3-1}$–$E_{3-13}$, and $E_{4-1}$–$E_{4-13}$ of respective enable driver groups $E_2$, $E_3$, and $E_4$, which drive cores of the unselected second, third, and fourth words on row $G_{1-50}$, will supply 1/3 select current in a direction opposite to the 2/3 read select current flowing in read drive line $R_{1-50}$ during the read portion of the memory cycle to prevent reading out therefrom, and in a direction opposite to the 2/3 write select current flowing in write drive line $W_{1-50}$ during the write portion of the memory cycle to prevent writing.

From the above discussion it will be evident that means must be provided for controlling the direction of flow of the 1/3 select current provided by each enable driver during read and write portions of a memory cycle in order to permit the selected one of four words on a given row to be accessed while the other three words on the row remain essentially undisturbed.

Figure 9:
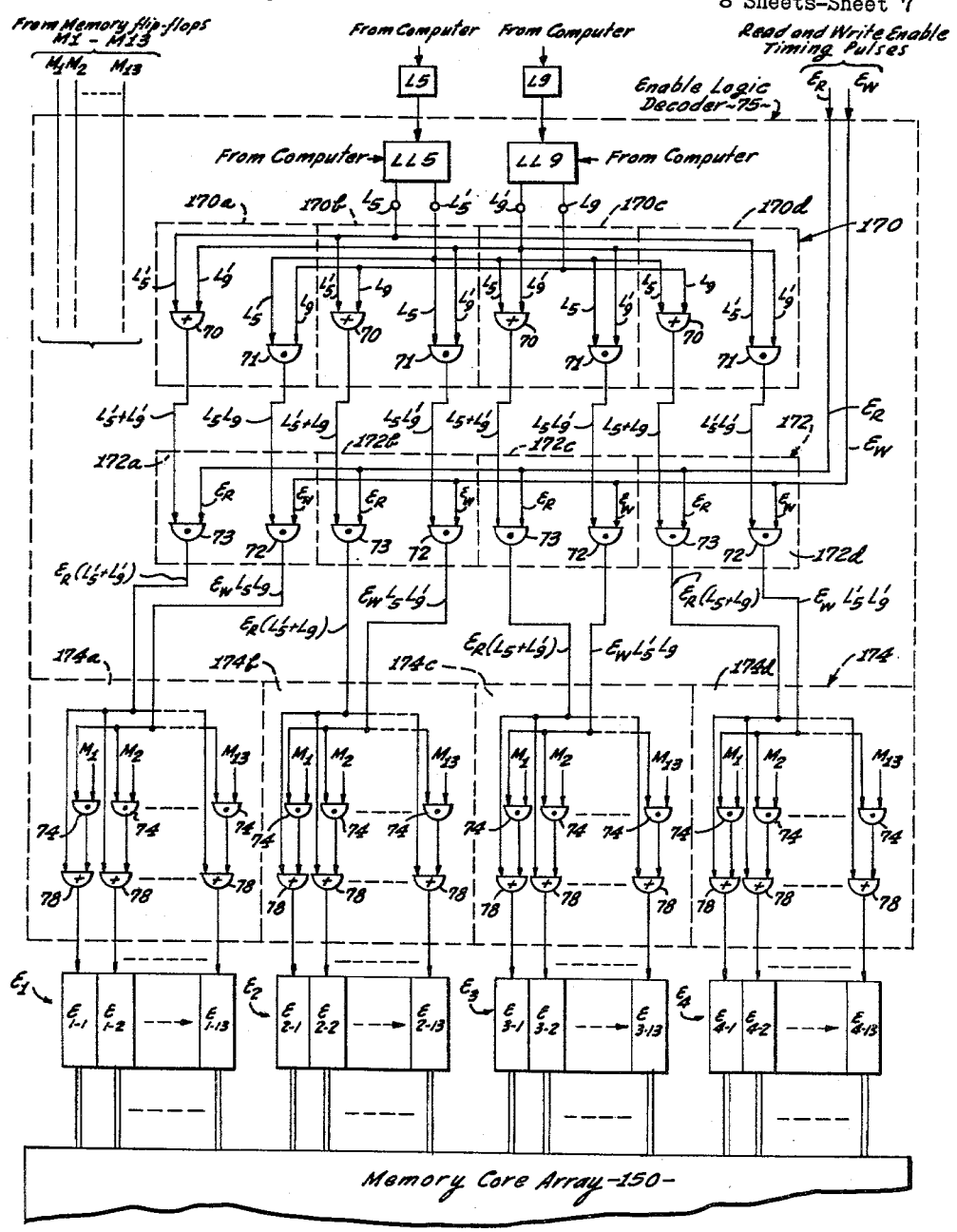
FIG. 9 is a block diagram illustrating a specific embodiment of the enable logic decoder 75 of FIG. 1.

As will be understood by those skilled in the art, various means may be provided for this purpose in accordance with present knowledge in the art. One such means is generally illustrated in FIG. 1 by the block 75 entitled enable logic decoder which provides a control line to each enable driver for control of the direction of flow of the 1/3 select current provided thereby. This enable logic circuitry 75 is constructed and arranged to logically combine the memory register outputs $M_1$–$M_{13}$ and the outputs of two more address register flip-flops L5 and L9 applied thereto along with enable read and write timing pulses $E_R$ and $E_W$, so that the direction of flow of the 1/3 select current supplied by each enable driver during read and write portions of the memory cycle is controled in a manner which permits the desired one of the four words on the selected row to be accessed as described previously. FIG. 9 illustrates a preferred form of the enable logic circuitry 75, and will be described in detail further on in this specification.

*Description of the operation of the data-storage system of FIG. 1 using the timing relationships of FIG. 4*

A typical memory cycle will now be described for the data-storage system illustrated in FIG. 1 using the graphs A–L of FIG. 4. The various timing pulses $E_D$, $E_{RD}$, $E_{WD}$, $E_R$, $E_W$, and $E_S$ illustrated in FIG. 4 and previously referred to in the description of the FIG. 1 embodiment may be generated in a number of well known ways. For example, as shown in FIG. 1a, clock initiating pulses $E_C$ from a clock pulse source 10 are fed to a memory timing pulse generator 12, which by means of various delay and pulse forming circuitry generates the required timing pulses at its output. It will be appreciated that the clock initiating pulses $E_C$ from the clock source 10 may also be used as reference pulses for other units of a computer (not shown) operating in cooperation with the data-storage system of FIG. 1.

Referring now to the graphs of FIG. 4, a typical memory cycle of 6 microseconds is illustrated. Graph A of FIG. 4 illustrates the clock initiating pulse $E_C$ obtained at the output of the clock pulse source 10 in FIG. 1a every 6 microseconds. Graph A also illustrates, in dashed lines, the appearance of a logical clock pulse $E_L$ at 3.5 microseconds in the memory cycle, such as might be provided by a computer with which the data-storage system of FIG. 1 is being used. In such a typical computer, the logic clock pulse $E_L$ may be considered to represent that time at which the computer has completed any operations it wished to perform on the word read out of the memory array 150 in FIG. 1, as well as having reset the memory register flip-flops $M_1$–$M_{13}$ (FIG. 1) if a new word is to be written back into the array at the same address. Thus, the appearance of the logic clock pulse $E_L$ at 3.5 microseconds may conveniently be used to divide the memory cycle into read and write portions as illustrated in graph A.

At this time, it may be pointed out in connection with the graphs of FIG. 4, that the specific timing arrangement and waveforms shown therein are merely exemplary and are not to be considered as limiting the present invention. Also, many of the waveforms shown in the graphs of FIG. 4 are idealized in that rise and decay times and other transient distortions have been eliminated for greater clarity, particularly since such considerations are outside the scope of this invention and are not necessary for a full understanding thereof. In all cases, however, it may be assumed that sufficient time has been provided between operating events to permit any transients to become negligible.

As shown by graph B, at 0.8 microsecond after the appearance of the clock initiating pulse $E_C$, a decoder timing pulse $E_D$ is generated by the memory timing pulse generator 12 (FIG. 1a) and fed to the decoders 25 and 125 (FIG. 1) to initiate the decoding action thereof in accordance with the settings of address registers L1–L4, L5–L8, L10–L12, and L13–L16. It will be assumed that these address register flip-flops L1–L16 are set to the desired address corresponding to the selected word in the array 150 at least by the time 0 when each memory cycle begins. Also, it will be assumed that flip-flops $M_1$–$M_{13}$ of the memory register are also cleared at the beginning of the memory cycle to permit the selected word to be read out of the array 150 during the read portion of the memory cycle to be stored therein. The delay of 0.8 microsecond between the clock initiating pulse $E_C$ and the decoder timing pulse $E_D$ is provided to permit all transient effects resulting from these settings or from operations occurring in the previous memory cycle to become negligible.

Again assuming that the selected word in the array 150 to be accessed is the first word on row $G_{1-50}$, the appearance of the decoder timing pulse $E_D$ during the read portion of the cycle will then cause decoders 25 and 125 to activate read drivers $R_1$ and $R'_{50}$. Thus, when the read dummy timing pulse $E_{RD}$ shown in graph C is fed to the read dummy 20 at 1.1 microseconds in the memory cycle to unshort the read current source 22, a 2/3 read select current, indicated at $2I/3$ in graph D, will then pass from the read current source 22 through the selected read drive line $R_{1-50}$ on row $G_{1-50}$ by way of read drivers $R_1$ and $R'_{50}$.

Graphs E and F show the enable read and write timing pulses $E_R$ and $E_W$ provided by the memory timing pulse generator 12 (FIG. 1a) and fed to the enable logic circuitry 75 for use in cooperation with the outputs of address register flip-flops L5 and L9 and the memory register flip-flop outputs $M_1$–$M_{13}$ for controlling the direction of $I/3$ select current flow in the enable drivers during the memory cycle, whereby a selected one of the four words on the selected row is accessed. The specific purpose of these enable timing pulses $E_R$ and $E_W$ is to tell the enable logic circuitry 75 which portion of the memory cycle (that is, read portion or write portion) is taking place, so that the direction of flow of 1/3 select current in the enable drivers can be controlled accordingly. The logical combination of these enable read and write timing pulses $E_R$ and $E_W$ with memory register flip-flop outputs $M_1$–$M_{13}$ and the outputs of address registers L5 and L9 will be more fully explained in connection with FIG. 9 which illustrates a specific embodiment of the enable logic circuitry 75 of FIG. 1.

Since the address registers L1–L16 are set at least by the time the memory cycle begins, as are the enable timing pulses $E_R$ and $E_W$ of graphs E and F, the direction of flow of the 1/3 select current in each enable driver for the read portion of the memory cycle is likewise established at the beginning of each memory cycle as illustrated in graphs G and H of FIG. 4. Graph G illustrates the enable current of 1/3 read select current, or $I/3$, supplied by each of the 13 enable drivers $E_{1-1}$–$E_{1-13}$ of the enable driver group $E_1$, which drive the cores of the first or selected word on row $G_{1-50}$; and graph H illustrates the enable current of 1/3 write select current, or $-I/3$, supplied by each of the 39 enable drivers $E_{2-1}$–$E_{2-13}$, $E_{3-1}$–$E_{3-13}$, and $E_{4-1}$–$E_{4-13}$ of the respective three enable driver groups $E_2$, $E_3$, and $E_4$, which drive the cores of the three unselected words on row $G_{1-50}$.

Thus, when the read dummy timing pulse $E_{RD}$ appears at 1.1 microseconds to unshort the read dummy 20 from across the read current source 28, the 2/3 read select current, or $2I/3$, thereby caused to flow in read drive line $R_{1-50}$ of the selected row $G_{1-50}$ (as indicated in graph D) adds to the $I/3$ enable current in the cores of the first or selected word on row $G_{1-50}$ to provide the full read select current in each selected core required for read out therefrom; while in cores of unselected words on row $G_{1-50}$ the $-I/3$ enable current applied thereto subtracts from the 2/3 read select current, or $2I/3$, to provide a resultant current of only 1/3 read select current, or $I/3$, thereby maintaining these unselected cores essentially undisturbed. Since all other cores in the array not on the selected row also receive only 1/3 select current, the desired high ratio of 3 to 1 between currents applied to selected and unselected cores is achieved during the reading operation.

Graph I illustrates a typical signal induced in a bit position sense line at approximately 1.8 microseconds in response to the switching of a selected bit position core from a "1" to a "0," thereby indicating the storage of a "1" therein. Of course, if the selected core stored a "0," no switching occurs, the core remains in the "0" state, and there is no signal induced in the bit position sense line.

Each induced sense line signal, for example, a signal induced in the bit 1 sense line as a result of core 15 of the selected word having stored a "0" therein, passes to its respective sense amplifier for amplification thereof. As shown in graph J, the strobe timing pulse $E_S$ supplied by the memory timing pulse generator 12 (FIG. 1a) is applied to the strobe generator 25 to open gates $P_1$–$P_{13}$ at about 1.8 microseconds, the peak of the sense line pulse of graph I, thereby permitting each amplified sense line pulse appearing at the output of its respective sense amplifier to pass to its respective memory register flip-flop to store a "1" therein; on the other hand, each amplifier whose sense line has no induced pulse will pass no pulse to its respective memory register flip-flop, causing it to remain in the "0" state and store a "0" therein. Thus, upon the appearance of the strobe pulse $E_S$, the selected word in the array 150 is set up in the memory register flip-flops $M_1$–$M_{13}$ and from that time to the computer logic clock pulse $E_L$, a computer may make use of the selected word in the memory register in any desired manner, as indicated by the logic period shown in graph J. When the computer logic clock pulse $E_L$ appears, the selected word read into the memory register flip-flops $M_1$–$M_{13}$ during the read portion of the memory cycle may be retained, or else, in response to logical operations of the computer, a new word may be stored therein to be written back into the same address of the array 150 during the write portion of the memory cycle.

It may be noted that since the direction of flow of the 1/3 select current supplied by each enable driver is established at the beginning of the memory cycle, as shown by graphs G and H, any transients resulting therefrom will ordinarily have died out before the read dummy timing pulse $E_{RD}$ of graph C will have appeared, and thus before the 2/3 read select current is applied to the selected row. It will be understood, therefore, that the only 1/3 partially selected cores that could introduce noise into the bit position sense line, are the bit position sensors of the unselected words on the selected row. However, as described previously in connection with FIG. 3, because the sense line is wound cancelling, the resultant signal induced in the bit position sense from the 1/3 partial switching of the three unselected cores on the same row and bit position as the selected core is no more than that induced by a single 1/3 selected core, which is relatively small as compared to the induced signal obtained in response to the switching of a selected core. In addition, by positioning the strobe pulse $E_S$ of graph J at the peak of the induced sense line pulse at 1.8 microseconds as shown in graph I, any signal induced in the sense line from 1/3 partially selected cores will have died out to a considerable extent; this is because the induced signal in the sense line from partially selected cores occurs before the main pulse of the fully selected core.

Since it is the presence of the read dummy timing pulse $E_{RD}$ of graph C which unshorts the read dummy 20 from across the read current source 22, it is this pulse which effectively controls the duration of flow of 2/3 read select current through the read drive line $R_{1-50}$ of the selected row as indicated in graph D (this assumes of course that the selected read drivers $R_1$ and $R'_{50}$ remain activated at least for the duration of $E_{RD}$). In order to permit those selected cores storing a "1" to be fully switched to the "0" state, the read dummy timing pulse $E_{RD}$ is maintained until 3.2 microseconds in the memory cycle, that is, for a total duration of 2.1 microseconds, which is sufficient to fully switch a typical ferrite core of the type which might be used in the memory core array 150 of FIG. 1.

At the appearance of the leading edge of the logic clock pulse $E_L$ at 3.5 microseconds in the memory cycle, the read portion of the memory cycle may be considered to come to an end and the write portion of the cycle to begin. If a different word from the one read out of the array and stored in the memory register flip-flops $M_1$–$M_{13}$ is to be written back into the array 150 (FIG. 1) during the write portion of the memory cycle, the memory register flip-flops $M_1$–$M_{13}$ are set to correspond to the new word at the time the logic clock pulse $E_L$ appears.

As shown by graphs G and H of FIG. 4, the required direction of flow of the 1/3 select current supplied by each enable driver during the write portion of the memory cycle is also established at the appearance of the logic clock pulse $E_L$, the direction of flow in each enable driver being determined in accordance with the memory register outputs $M_1$–$M_{13}$ and the outputs of flip-flops $L_5$ and $L_9$. Thus, as shown in graph G, each of the 13 enable drivers $E_{1-1}$–$E_{1-13}$ of the enable driver group $E_1$, which drive the cores of the selected first word on row $G_{1-50}$, is caused to supply a current of $-I/3$ (that is, 1/3 write select current), indicated by the solid line in graph G, if a "1" is to be written into the selected core corresponding thereto, and a current of $I/3$ (that is, 1/3 read select current), indicated by the dotted line in graph G, if a "0" is to be written therein. On the other hand, as shown in graph H, each of the 39 enable drivers $E_{2-1}$–$E_{2-13}$, $E_{3-1}$–$E_{3-13}$, and $E_{4-1}$–$E_{4-13}$ of respective enable driver groups $E_2$, $E_3$, and $E_4$, which drive the cores of the unselected words on row $C_{1-50}$, are caused to supply a current of $I/3$ (that is, 1/3 read select current).

Consequently, when the decoder timing pulse $E_D$ is switched off at the logic clock pulse $E_L$, causing decoders 25 and 125 to activate read drivers $W_1$ and $W'_{50}$, and the write dummy timing pulse $E_{WD}$ of graph K appears at 4.5 microseconds to unshort the write dummy 30 from across the write current source 28, the 2/3 write select current, or $-2I/3$, thereby caused to flow in the write drive line $W_{1-50}$ of the selected row $G_{1-50}$ (as indicated in graph L) adds to the $-I/3$ enable current flowing in those cores of the selected first word in which a "1" is to be written to provide full write select current to switch these cores from the "0" state in which they were left after read-out therefrom to the "1" state, and thereby store a "1" therein.

On the other hand, the 1/3 read select current, or $-I/3$, flowing in the other cores of the selected word as well as in the cores of unselected words on the row, subtracts from the 2/3 write select current, or $-2I/3$, flowing in the write drive line $W_{1-50}$ to provide a resultant current of only $-I/3$; as a result, cores of the selected word in which a "0" is to be written remain in the "0" state in which they were left after readout therefrom to thereby store a "0" therein, while the states of cores of unselected words on the row again remain undisturbed as they did during the read portion of the cycle. Also, all other cores in the array not on the selected row are disturbed by only 1/3 select current flowing in their respective enable lines. Thus, the desired high ratio of 3 to 1 between currents applied to selected and unselected cores is achieved during the write portion of the cycle as well as during the read portion.

Similarly to the read dummy timing pulse $E_{RD}$, the write dummy timing pulse $E_{WD}$ is caused to appear at 1.0 microsecond after the beginning of the write portion of the cycle in order to permit any transients from the read portion of the cycle or from settings made by the logic clock pulse $E_L$ to decay to a negligible level. Also, the write dummy timing pulse remains till the end of the memory cycle at 6.0 microseconds to provide sufficient time to allow those cores in which a "1" is to be written to be fully switched.

*Description of a specific embodiment of the decoder 25 of FIG. 1*

While various types of circuitry could be employed for the decoders 25 and 125 of FIG. 1, a particularly advantageous decoder has been devised which is admirably suited to the purposes and objects of the present invention. Such a decoder is illustrated in FIG 5 for the decoder 25, but as will become apparent, the decoder 125 may be similarly constructed.

Referring to FIG. 5, it will be seen that the four address flip-flop L1–L4 are fed to a first diode decoder 27, which may be of conventional form, while the three address flip-flops L6–L8 are fed to a second diode decoder 29, which may also be of conventional form.

The diode decoder 27 provides 10 outputs representing 10 of the 16 possible combinations of the states of flip-flops L1–L4. These outputs from the decoder 27 are fed to activate one of 10 drivers $D_1$–$D_{10}$ in response to the setting of the address register flip-flops L1–L4. In a like manner, the diode decoder 29 provides 5 outputs representing 5 of the 9 possible combinations of flip-flops L6–L8, and these outputs are fed to activate one of five drivers $D'_1$–$D'_5$ in response to the settings of flip-flops L6–L8.

As shown in FIG. 5, the drivers $D_1$–$D_{10}$ and $D'_1$–$D'_5$ are provided to select one of 50 rows of decoder array of 50 decoder cores by means of linear selection, similar to the manner in which one of the 2500 rows of the array 150 of FIG. 1 is selected, except that each row of decoder 25 has only one decoder core (typically illustrated by the numeral 35), and as will hereinafter be described, full select current is passed through the drive line (typically illustrated by the numerical 38) of the selected row of decoder 25, instead only 2/3 select current, as is passed through the selected row in the array 150 of FIG. 1, as previously described.

Specifically, the 50 decoder cores and their respective drive lines are arranged in 10 groups of 5 each. The drive lines 38 are driven at one end by the 10 decoder core drivers $D_1$–$D_{10}$ such that each of the drivers $D_1$–$D_{10}$ is connected to all the drive lines of a respective one of the 10 groups, while the other ends of drive lines 38 are driven by drivers $D'_1$–$D'_5$, through a respective diode 33 in each drive line 38, such that each of the decoder core drivers $D'_1$–$D'_5$ connects a correspondingly positioned drive line 38 in each of the 10 groups of decoder cores. The diode 33 is provided for the same reason as are the diodes 13 and 23 in FIG. 1, to prevent sneak currents from flowing through drive lines other than the selected drive line, which would otherwise occur because of the many parallel paths present in this type of linear selection system, as described previously.

A drive current is applied to a selected one of the 50 decoder cores by means of a decoder voltage source 41 which is triggered on by the decoder timing pulse $E_D$, whereupon full select current is passed through the one drive line 38 of the 50 drive lines whose drivers have been activated at both ends thereof by diode decoders 27 and 29 in accordance with the settings of flip-flops L1–L4 and L6–L8, respectively. For example, if the settings of address register flip-flops L1–L4 are such that driver $D_{10}$ is activated by diode decoder 27 and the setting of address register flip-flops L6–L8 are such that driver $D'_5$ is activated by diode decoder 29, then when the decoder timing pulse $E_D$ appears, current will flow from the decoder voltage source 41 through the last or fiftieth drive line 38 by means of drivers $D_{10}$ and $D'_5$ to select the fiftieth decoder core in the array.

Figure 5A:
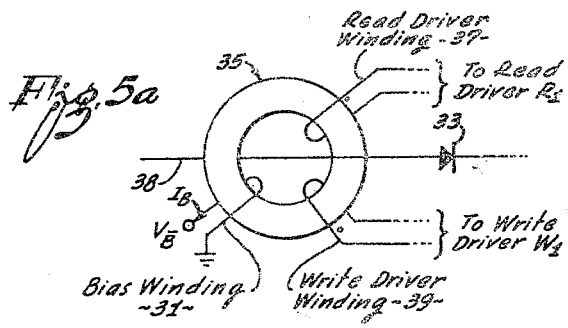
FIG. 5a is a detailed diagram of a typical decoder core 35 of FIG. 5.

As shown in FIG. 5a which illustrates a typical decoder core 35 in detail, each decoder core 35 is provided with three other windings besides drive winding 38, these being a bias winding 31, a read driver winding 37, and a write driver winding 39. Although only single turn windings are shown in FIG. 5a, it will be understood that these four windings 31, 37, 38, and 39 on each decoder core 35 could be provided with any desired number of turns. Using a tape wound core for each decoder core 35, it will usually be found advantageous to use multiturn windings.

As indicated in FIG. 5a, the read driver winding 37 is fed to a respective one of the 50 read drivers $R_1$–$R_{50}$ of FIG. 1 and the write driver winding 39 is fed to a respective one of the 50 write drivers $W_1$–$W_{50}$. For example, if the selected decoder core is assumed to be the first core 35 in the decoder core array, then its read and write driver windings would be fed to read and write drivers $R_1$ and $W_1$, respectively.

The bias winding 31 on each decoder core 35 receives a bias current $I_B$ from a voltage source $-V_B$, which is chosen to be of sufficient magnitude to maintain the core 35 saturated in a predetermined state (which will be assumed to be the "0" state) in the absence of a drive current in the decoder core drive line 38. Fig 6, which shows a typical hysteresis loop of a decoder core 35, illustrates such as condition, the designation $H_B$ representing the coercive effect applied to each decoder core 35 as a result of the bias current $I_B$ flowing in the bias winding 31. Each decoder core 35 thus rests at a point on its hysteresis loop, such as indicated at P in FIG. 6, which will be assumed to correspond to the "0" state of the core 35.

The decoder voltage source 41 is chosen so that the coercive effect $H_D$ applied to the selected decoder core 35, as a result of drive current flowing in the selected drive line 38 upon the appearance of the decoder timing pulse $E_D$, is of sufficient magnitude to drive the selected decoder core 35 to the opposite or "1" state, as illustrated in FIG. 6, if sufficient time is available to permit this switching to take place.

The amount of time available for switching the selected decoder core 35 may be determined by referring again to graph B of FIG. 4, in which the decoder timing pulse $E_D$ will be seen to appear at 0.8 microsecond in the memory cycle and return to zero at 3.5 microseconds for a total duration of 2.7 microseconds. This duration of 2.7 microseconds of the decoder timing pulse $E_D$ determines the time for which the decoder voltage source 41 supplies drive current to the drive line 38 of the selected core 35, and is chosen in conjunction with the characteristics of the decoder core 35 so that the decoder core 35 can not be fully switched to the "1" state in the 2.7 microsecond duration of the decoder timing pulse $E_D$ provided. The point on its hysteresis loop of FIG. 6 to which the selected decoder core 35 is switched in the 2.7 micro-seconds for which the drive current is present is illustrated by the point Q. When the decoder timing pulse $E_D$ returns to zero at 3.5 microseconds in the memory cycle, the coercive effect $H_D$ is thereby removed and the coercive effect $H_B$ then acts to return the decoder core 35 to the point P by the dashed line path illustrated in FIG. 6 which merges with the back end of the hysteresis loop.

During the partial switching action of the selected decoder core 35 just described, voltages are induced in its read and write driver windings 37 and 39 which are fed to respective read and write drivers thereof in a manner which causes these read and writer drivers to be activated during respective read and write portions of a memory cycle. Thus, any corresponding pair of the 50 pairs of read and write drivers $R_1$–$R_{50}$ and $W_1$–$W_{50}$ at the left end of the array 150 in FIG. 1 may be activated by selecting a corresponding decoder core 35, and, as pointed out previously, this is accomplished in accordance with the settings of address register flip-flops L1–L4 and L6–L8. In a like manner any corresponding pair of the 50 pairs of read and write drivers $R'_1$–$R'_{50}$ and $W'_1$–$W'_{50}$ at the opposite end of the array 150 in FIG. 1 may be activated by selecting a corresponding decoder core in the similarly constructed decoder 125 in accordance with the settings of address register flip-flops L10–L12 and L13–L16 to complete the selection of a particular one of the 2500 rows in the array 150 of FIG. 1.

The specific manner in which the read and write driver windings of selected decoder cores in decoders 25 and 125 operate to activate their corresponding read and write drivers during read and write portions of a memory cycle in response to the switching of the decoder cores selected by decoders 25 and 125 will now be explained by means of the schematic diagram of FIG. 7. In the portion of the decoder 125 shown in FIG. 7, elements corresponding to like elements in decoder 25 have been designated by numerals exactly 100 greater than the numerals designating like elements in the decoder 25. For example, the decoder core and read and write windings in decoder 125 are respectively designated as 135, 137, and 139 in decoder 125 corresponding to like elements 35, 37, and 39 of decoder 25.

For convenience, it will again be assumed that the row to be selected is row $G_{1-50}$ of group $G_1$ and for simplicity of illustration only the specific decoder cores and read and write drivers necessary to make this selection are shown in FIG. 7. As described previously, to select row $G_{1-50}$, it is necessary to activate read drivers $R_1$ and $R'_{50}$ during the read portion of a memory cycle and to activate corresponding write drivers $W_1$ and $W'_{50}$ during the write portion of the cycle. In order to permit the activation of these read and write drivers to be more clearly understood, illustrative embodiments thereof are shown in FIG. 7 along with illustrative embodiments of the read and write current sources 22 and 28, respectively, and the read and write dummies 20 and 30 associated therewith.

Considering first the read and write drivers $R_1$, $R'_{50}$, $W_1$, and $W'_{50}$ in FIG. 7, it will be seen that each may typically comprise PNP transistor 26 having a base, an emitter, and a collector. The respective driver winding feeding each transistor is connected between the base and emitter elements thereof through a parallel resistor-capacitor network 24 provided in series with the transistor base in a conventional manner. As will be understood by those skilled in the art, the resistor of the network 24 serves to limit current applied to the transistor base while the capacitor of the network 24 serves to provide a fast response to an applied input signal.

It will be noted (as conventionally indicated by the location of the "dots" in the schematic illustrations of the read and write driver windings of the decoder cores in FIG. 7), that the read and write drivers windings of each decoder core 35 or 135 are connected opposite in polarity with respect to their respective transistors 26. As will hereinafter be described, this opposite connection of the read and write driver windings of each decoder core permits either the two selected read drivers $R_1$ and $R'_{50}$ or the two selected write drivers $W_1$ and $W'_{50}$ to be activated, but not both, during respective read and write portions of the memory cycle.

As shown in FIG. 7, the collectors of transistor 26 of read driver $R_1$ and write driver $W'_{50}$ are connected to their respective read and write current sources 22 and 28 while the emitters thereof are connected to their respective read and write drive lines. On the other hand, the collectors of the transistors 26 of the read driver $R'_{50}$ and write driver $W_1$ are connected to their respective read and write drive lines while the emitters thereof are connected to circuit ground. The transistors of all other read and write drivers are connected in a similar manner to those shown in FIG. 7. In the absence of a signal in the driver winding of a transistor 26, the transistor 26 will be essentially cut off preventing current flow to or from the drive lines to which the driver is connected.

Now considering the read current source 22 and the write current source 28, it will be seen that each may typically comprise an NPN transistor 29 having its emitter connected to a negative voltage source E— through a load resistor 29a, its base connected to a negative voltage V— to bias the transistor 29 into the conducting state, and its collector to one end of an inductor 21. The other end of the inductor 21 of the read current source 22 is connected to the collectors of the transistors 26 of all the other read drivers $R_2$–$R_{50}$ in the same manner as illustrated for the read driver $R_1$ in FIG. 7. Similarly, the other end of the inductor 21 of the write current source is connected to the collectors of the transistor 26 of all the other write drivers $W'_1$–$W'_{49}$ in the same manner as illustrated for the write driver $W'_{50}$ in FIG. 7.

The read and write dummies 20 and 30 may typically comprise a PNP transistor 27 having its emitter connected to circuit ground, its collector connected to the output of its respective read or write current source 22 or 28 (which is the junction between the inductor 21 and the collectors of the transistors 26 of read drivers $R_1$–$R_{50}$ or write drivers $W'_1$–$W'_{50}$), and its base connected to receive a saturating bias current from a negative voltage source V— which maintains the transistor 27 saturated until the transistor 27 is cut off by application of its respective negative timing pulse $E_{RD}$ or $E_{WD}$ to the base thereof through the network 24. Thus, in the absence of the read dummy timing pulse $E_{RD}$, substantially all the current supplied by the read current source 22 will pass through the saturated transistor 27 of the read dummy 20, effectively shorting out the read current source 22 and thereby preventing read current flow to the read drivers $R_1$–$R_{50}$. Similarly, in the absence of the write dummy timing pulse $E_{WD}$, substantially all the current supplied by the write current source 28 will pass through the saturated transistor 27 of the write dummy 30 effectively shorting out the write current source 28 and thereby preventing write current flow to the write drivers $W'_1$–$W'_{50}$. The use of read and write dummies 20 and 30 with respective read and write current sources 22 and 28, as described herein, along with the provision of an inductor 21 through which current will always be flowing, is highly advantageous in improving reliability of operation and improved speed of response, as is explained in detail in the commonly assigned copending patent application S.N. 616,439 for Magnetic Core Driving Circuit, filed October 17, 1956 and now U.S. Patent No. 3,027,546 in the names of Royal E. Howes and Paul Higashi.

Having described typical embodiments of the read and write drivers $R_1$ and $R'_{50}$ and $W_1$ and $W'_{50}$ as well as the read and write current sources 22 and 28 and their respective read and write dummies 20 and 30, the operation of the read and write driver windings on each of the selected decoder cores to activate their respective read and write drivers during a memory cycle will now be clearly understood from the following discussion.

It will be remembered that when the decoder timing pulse $E_D$ appears at 0.8 microsecond, as shown in graph B of FIG. 4, a drive current is applied to the drive line 38 of the selected decoder core 35 of decoder 25 and also to the drive line 138 of the selected decoder core 135 of the similarly constructed decoder 125, producing a coercive effect $H_D$ which drives the selected decoder cores 35 and 135 from the point P shown in FIG. 5a to the point Q in the 2.7 microsecond time for which the decoder timing pulse $E_D$ is present. The change in flux in the selected decoder cores 35 and 135 resulting from this partial switching causes voltages to be induced in the read and write driver windings thereof. Because of the opposite polarity connections of the read and write driver windings of each decoder core with respect to their respective driver transistors 26, the transistors 26 of read drivers $R_1$ and $R_{50}$ receive negative signals from read driver windings 37 and 137, respectively, to turn these transistors on, while the transistors 26 of write drivers $W_1$ and $W'_{50}$ receive positive signals from write driver windings 39 and 139, respectively, to drive these transistors deeper into the cut off region. The read drivers $R_1$ and $R'_{50}$ thus activated then permit 2/3 read select current to flow through the selected read drive line $R_{1-50}$ when the read current source 22 is unshorted by the application of the read dummy timing pulse $E_{RD}$ to read dummy 20 at 1.1 microseconds, as shown in graphs C and D of FIG. 4.

When the decoder timing pulse $E_D$ falls to zero at 3.5 microseconds, causing the selected decoder cores to be driven back to point P by the coercive effect $H_B$ as indicated by the dashed line in FIG. 6, the signal induced in each driver winding will then be opposite in polarity to that induced therein when the decoder core was driven from points P to Q, since the flux is now changing in the opposite direction. Thus, negative signals from write driver windings 39 and 139, respectively, are now applied to the transistors 26 of write drivers $W_1$ and $W'_{50}$, turning these transistors on, while the transistors 26 of read drivers $R_1$ and $R'_{50}$ now receive positive signals from read driver windings 37 and 137, respectively, turning these transistors off and driving them deep into the cut off region. The write drivers $W_1$ and $W'_{50}$ thus activated then permit 2/3 write select current to flow through the selected write line $W_{1-50}$ when the write current source 23 is unshorted by the application of the write dummy timing pulse $E_{WD}$ to read dummy 30 at 4.5 microseconds, as shown in graphs K and L of FIG. 4.

The signals induced in the read and write driver windings during read and write portions of a memory cycle are illustrated in graph B' of FIG. 8. For convenience of comparison, FIG. 8 also reproduces graphs A, B, C, and L of FIG. 4, respectively illustrating the clock initiating pulse $E_C$, the decoder timing pulse $E_D$, the read dummy timing pulse $E_{RD}$ and the write dummy timing pulse $E_{WD}$.

It will be seen from graphs B and B' in FIG. 8 that approximately 0.2 microsecond after the decoder timing pulse $E_D$ appears, the signal in the read driver windings 37 and 137, illustrated by the solid line curve, rapidly rises to a negative value which is chosen to be at least sufficient to saturate the transistors 26 of the read drivers $R_1$ and $R'_{50}$ in FIG. 7. Simultaneously, the signal in the oppositely connected write driver windings 39 and 139, illustrated by the dotted line curve in graph B' of FIG. 8, rapidly rises to a positive value which drives the transistors 26 of write drivers $W_1$ and $W'_{50}$ deeply into the cut off region. The delay in the rise of these signals is a result of the switching time required to switch the respective decoder core drivers of the selected decoder cores in decoders 25 and 125. As shown by graphs B and B', the read dummy timing pulsing $E_{RD}$ of graph B is delayed to 1.1 microseconds in the memory cycle, which is 0.3 microsecond after the decoder timing pulse $E_D$. This 0.3 microsecond delay is provided to permit the negative pulses induced in the read driver windings 37 and 137 to rise to a level where the transistors 26 of read drivers $R_1$ and $R'_{50}$ are saturated, and also, to permit the positive pulses induced in the write driver windings 39 and 139 to strongly cut off the transistors 26 of write drivers $W_1$ and $W'_{50}$, thereby accurately establishing the start of 2/3 read select current flow in the selected read drive line $R_{1-50}$ while at the same time insuring that the write drivers $W_1$ and $W'_{50}$ are off.

The selected decoder cores 35 and 135 are driven constant voltage, as indicated by the provision of the decoder voltage source 41 in FIG. 5, so that substantially constant signals will be induced in the driver windings when the decoder cores are switching, as illustrated in somewhat idealized form in graph B' of FIG. 8. Since the flux in the decoder cores is still rapidly changing when the end of the decoder timing pulse $E_D$ is reached at 3.5 microseconds in the memory cycle, the positive and negative pulses induced in the write and read driver windings, respectively, remain substantially constant right up to 3.5 microseconds, the end of the read portion of the memory cycle. Thus, the reason for permitting only partial switching of the selected decoder cores instead of full switching should now become evident, since if the decoder core has not yet fully switched, the flux in the decoder cores will still be rapidly changing to maintain the signals induced in the read and write driver windings throughout the read portion of the memory cycle. This insures that the more accurate read dummy timing pulse $E_{RD}$ will determine the duration of the 2/3 read select current passed through the read drive line of the selected row, thereby increasing operational reliability. The switching time of the decoder cores 35 and 135 may be adjusted by the amount of core material provided in the construction thereof, since it takes longer to switch a core having more core material than less.

When the decoder timing pulse $E_D$ falls to zero at 3.5 microseconds as shown in graph B of FIG. 8, the coercive bias effect $H_B$ acts to return the selected decoder cores from the point Q to which they were driven during the read portion of the memory cycle, back to the point P as shown by the dashed curve in FIG. 5a. The decoder cores are designed so that in response to this return switching by the bias $H_B$, signals of sufficient duration to last throughout the write portion of the memory cycle are induced in the driver windings; but now, because the flux is changing in the opposite direction through the selected decoder cores, the write driver windings 39 and 139 receive negative signals which are chosen to be sufficient to saturate the transistors 26 of write drivers $W_1$ and $W'_{50}$ while the read driver windings 37 and 137 receive positive signals which drive the transistors 26 of read drivers $R_1$ and $R'_{50}$ deep into the cut off region.

As shown in graph B' of FIG. 8, the signals thus produced in the driver windings during the write position of the memory cycle appear at a considerable time before the write dummy timing pulse $E_{WD}$ and are of sufficient duration to remain throughout the write portion of the memory cycle. Thus, the write dummy timing pulse $E_{WD}$ accurately determines the timing of the 2/3 select write current passing through the selected write drive line, as did the read dummy timing pulse $E_{RD}$ for the 2/3 read select current during the read portion of the memory cycle, and provides the same advantages of operational reliability and speed of response during the write portion of the cycle. Also, since it is the selected read and write drivers which drive the selected row in the array during respective read and write portions of the memory cycle, and not the decoder cores themselves, the decoder cores may be operated at low power and the voltages induced in their respective read and write windings are not critical, as will be discussed further below.

From the above description of the construction and operation of the specific embodiment of the decoder of FIG. 5 in the system of FIG. 1, it will be evident to those skilled in the art that the economies of core decoding are retained by the specific embodiment thereof described herein, while at the same time achieving greatly increased reliability of operation as well as reducing the severe restrictions which are prevalent both in the construction and in the criticality of operation of prior art decoder core arrangements. In particular, it will be noted that in the decoder core arrangement of this invention, the particular magnitude and/or duration of the signals induced in the driver windings of the selected decoder cores are not critical during either the read or write portions of the memory cycle and no compensation means are required to achieve accurate signal values. All that is necessary is that the induced signals have some minimum magnitude to be able to saturate their respective transistors, and that the switching characteristics of the decoder cores be chosen to provide the desired partial switching in the period provided by the decoder timing pulse $E_D$, whereby the necessary duration of the induced signals is then automatically provided in accordance with the decoder timing pulse $E_D$, as described above.

Also, unlike prior art decoder core arrangements, the selected decoder cores in the present invention need only be operated at low power, since they are not required to drive the memory cores of the memory core array 150 directly, which as will be appreciated, is a significant advantage. Still further, the decoder core arrangement employed in the present invention achieves the important advantages of increased reliability and improved speed of response made possible by the use of a dummy load with a current source and an inductor for driving the cores of a memory array, as was explained in connection with FIG. 7 and as is more fully described in the aforementioned commonly assigned copending patent application S.N. 616,439, while retaining the reductions in decoder circuitry made possible by the use of a decoder core arrangement.

Still another advantage of the decoder core arrangement described herein is that the settings of the address register flip-flops L1–L4, L6–L8 feeding the decoder 25 and the settings of the address register flip-flops L10–L12 and L13–L16 feeding the decoder 125 (FIG. 1) may be changed after the read portion of the cycle, that is at 3.5 microseconds, in preparation for the next memory cycle. This is possible because the only decoder cores which can be switched back to induce signals in their driver windings are those which have been selected during the read portion of the memory cycle. Thus, the selected decoder cores themselves retain the settings of these address register flip-flops during the write portion of the cycle, without requiring that the settings of the address register flip-flops be retained, or in fact without requiring any other means which might be provided for this purpose. The retention of these settings by the selected decoder cores is most advantageous because any changes required in the settings of these address register flip-flops for the next memory cycle, or for some other purpose, can be accomplished during the write portion of the cycle, thereby making possible increased operational speeds. Also, because the decoder cores do not themselves drive the memory cores of the memory core array and instead employ the write drivers corresponding thereto for this purpose in the novel manner described, special care need not be taken with regard to the type or magnitude of signals induced in the driver windings during the write portion of the memory cycle (as is necessary in prior art decoder core arrangements) as long as these induced signals have the required minimum magnitude and sufficient duration, which is relatively simple to achieve as pointed out previously.

Yet another advantage of the decoder core arrangement described herein is that because the selected one of the 50 decoder cores in each of the decoders 25 and 125 is selected by means of linear selection, drive current is applied only to the selected decoder core and no others, thereby eliminating any possible problems which may result from partial selection of unselected decoder cores and unwanted voltages which would then have to be reckoned with in the read and write driver windings of partially selected decoder cores.

*Description of a specific embodiment of the enable logic decoder 75 of FIG. 1*

As described previously, the enable logic decoder 75 of FIG. 1 provides an output for each of the 52 enable drivers which, in response to the settings of address register flip-flops L5 and L9, the outputs $M_1$–$M_{13}$, and the read and write enable timing pulses $E_R$ and $E_W$, controls the direction of flow of the 1/3 select current supplied by each enable driver during read and write portions of a memory cycle so as to permit the cores of the selected one of four words on the selected row to be accessed. A specific embodiment of a typical enable logic decoder 75 which may be employed for this purpose is illustrated in the block diagram of FIG. 9.

Referring to FIG. 9, it will be seen that the address register flip-flops L5 and L9 are respectively fed to auxiliary flip-flops LL5 and LL9. These auxiliary flip-flops LL5 and LL9 are provided to permit the settings of the address register flip-flops L5 and L9 to be changed along with the other 14 address register flip-flops L1–L4, L6–L8, L10–L12, and L13–L16, which as just described, can be changed right after the read portion of the memory cycle because the decoder cores effectively retain the settings thereof. The auxiliary flip-flops LL5 and LL9 retain the settings of their respective address register flip-flops L5 and L9 throughout the write portion of the memory cycle and may then be set to the new settings of L5 and L9 either at the end of the write portion of the memory cycle, or at the beginning of the read portion of the next memory cycle. Means for this purpose are generally indicated in FIG. 9 by the arrows feeding the flip-flops LL5 and LL9 from a computer with which the system of FIG. 1 may be used.

Before describing the enable logic decoder 75 further, the logical notations and expressions which are employed in FIG. 9 will first be explained. As is well known and is conventionally done in the art, the two possible states of a flip-flop may be designated as "true" and "false." Each flip-flop may then be considered to have two inversely related outputs corresponding to the two voltage levels thereof, each of these outputs being indicative of the state of the flip-flop.

For example, if the flip-flop comprises two vacuum tube triodes connected for flip-flop operation in a conventional manner, these two inversely related outputs may conveniently be obtained by providing an output lead from the plate of each triode. Or, if two transistors are connected common emitter for flip-flop operation, these two inversely related outputs may be obtained by providing an output lead from the collector of each transistor. In accordance with well known flip-flop operation, such outputs will switch between two voltage levels each time the flip-flop changes its state, the voltage level at one output always being opposite to the voltage level at the other output. If for convenience it is assumed that the two voltage levels are a negative voltage and zero voltage, the presence of a negative voltage on a flip-flop output may be designated as "true" and a zero voltage may be designated as "false."

The two inverse outputs of a flip-flop may then be designated by a convenient symbol, which if unprimed represents that output of a flip-flop which is true (that is, provides a negative output signal) when the flip-flop is true, and if the symbol is primed represents that output of the flip-flop which is false (that is, provides a zero voltage output signal) when the flip-flop is true, and vice versa when the flip-flop is false.

Following the above designations, the two inverse outputs of flip-flop LL5 may be designated as $L_5$ and $L'_5$, and the two inverse outputs of the flip-flop LL9 may be designated $L_9$ and $L'_9$ as shown in FIG. 9; each of the unprimed outputs $L_5$ and $L_9$ from flip-flops LL5 and LL9, respectively, will then be true (negative) when its respective flip-flop is true, and false (zero) when its respective flip-flop is false. Inversely, each of the primed outputs $L'_5$ and $L'_9$ from flip-flops LL5 and LL9, respectively, will be true (negative) when its respective flip-flop is false, and false (zero) when its respective flip-flop is true. Logical combinations of the outputs $L_5$ and $L'_5$ of flip-flop LL5 and the outputs $L_9$ and $L'_9$ of flip-flop LL9 may then be represented by well known Boolean algebraic notation in which the outputs $L_5$, $L'_5$, $L_9$, and $L'_9$ are the terms employed in the Boolean expressions, as will be better undestood from the further description of the enable logic decoder 75 of FIG. 9 which now follows.

In FIG. 9, it will be seen that the outputs $L_5$, $L'_5$, and $L_9$, $L'_9$ from the flip-flops LL5 and LL9, respectively, are fed to a first group 170 of logical circuits having four sections 170a, 170b, 170c, and 170d. Each section comprising an "or" circuit 70 (indicated by the "plus" sign on the semicircular representation thereof) which is constructed and arranged to form the logical sum of two binary inputs applied thereto, and an "and" circuit 71 (indicated by the multiplication "dot" on the semicircular representation thereof) which is constructed and arranged to form the logical product of two binary inputs applied thereto. Briefly, an "and" circuit, such as 71 in FIG. 9, provides a true output (that is, a negative signal) only if both inputs are true, and a false output (zero voltage) if neither or only one input is true. An "or" circuit, on the other hand, such as 70 in FIG. 9, provides a true output if either or both inputs are true, and a false output only if neither input is true. Such "and" and "or" logical circuits are well known in the art and will not be further described herein.

It will now be understood that each of the sections 170a, 170b, 170c and 170d of the logical group of circuits 170 forms the logical product of one of the four possible combinations of the outputs of flip-flops LL5 and LL9 by means of its "and" circuit 71, and the logical product of the inverse of these two outputs by means of its "or" circuit 70. For example, the "and" circuit 71 of section 170a provides at its output the logical product of $L_5$ and $L_9$ (conventionally represented as $L_5L_9$) and the "or" circuit 70 of section 170a provides at its output the logical sum of the inverse $L_5$ and $L_9$, that is, the logical sum of $L'_5$ and $L'_9$ (conventionally represented as $L'_5 + L'_9$).

As shown in FIG. 9, the logical products and logical sums of the four possible combinations of the outputs $L_5$ and $L'_5$ of flip-flop LL5 and the outputs $L_9$ and $L'_9$ of flip-flop LL9 thus obtained from the four sections 170a, 170b, 170c, and 170d of the group of logical circuits 170 are respectively fed to four corresponding sections 172a, 172b, 172c, and 172d of a second group of logical circuits 172 for combining the enable read and write timing pulses $E_R$ and $E_W$ therewith. Each of the four sections 172a, 172b, 172c and 172d comprises two "and" circuits 72 and 72, each of which may be constructed and arranged in the same manner as the "and" circuits 71 in the first group of logical circuits 170.

Considering first the "and" circuit 72 in each of the sections 172a, 172b, 172c, and 172d of the group of logical circuits 172, it will be seen the write enable timing pulse $E_W$ is applied to one input of "and" circuit 72, while the output from the "and" circuit 71 of the corresponding section of the group of logical circuits 170 is applied to the other input thereof. In a similar manner, the read enable timing pulse $E_R$ is applied to one input of "and" circuit 73, while the output from the "or" circuit 70 of the corresponding section of the group of logic circuits 170 is applied to the other input thereof.

Consequently, each section of the group of logical circuits 172 acts to multiply the respective logical product of the two outputs of flip-flops LL5 and LL9 applied thereto by the write enable timing pulse $E_W$, while the respective logical sum of the inverse of these two outputs of flip-flops LL5 and LL9 applied thereto are multiplied by the read enable timing pulse $E_R$. For example, as shown in FIG. 9, the logical product $L_5L_9$ applied to section 172a of the group of logical circuits 172 is multiplied in "and" circuit 72 by the write enable timing pulse $E_W$ to form the logical product $E_WL_5L_9$ at the output thereof, while the logical sum $L'_5+L'_9$ also applied to section 172a is multiplied in "and" circuit 73 by the read enable timing pulse $E_R$ to form the logical product $E_R L'_5+L'_9$).

The two outputs from each of the four sections 172a, 172b, 172c, and 172d of the second group of logical circuits 172 are each fed to a corresponding section of a third group of logical circuits 174 having four sections 174a, 174b, 174c, and 174d which feed enable driver groups $E_1$, $E_2$, $E_3$, and $E_4$, respectively. Each of the four sections 174a, 174b, 174c, and 174d comprises 13 "and" circuits 74 and 13 "or" circuits 78. The outputs of the 13 "or" circuits 78 in each of the sections 174a, 174b, 174c, and 174d feed respective ones of the 13 enable drivers to which that section corresponds.

One of the inputs of each of the 13 "or" circuits 78 of a particular section is fed by the output of the "and" circuit 73 of the corresponding section of the group of logical circuits 174; the other input of each of the 13 "or" circuits 78 of the section is fed by a respective one of the 13 "and" circuits 74, the two inputs of the 13 "and" circuits 74 being in turn fed by a corresponding one of the 13 memory register outputs $M_1$–$M_{13}$ and the output of the "and" circuit 74 of the corresponding section of the group of logical circuits 172.

Each enable driver is constructed and arranged so that when the output of its respective "or" circuit 78 is false, or zero volts, the 1/3 select current supplied by the enable driver will be in the read direction, and if the output of its respective "or" circuit 78 is true, or negative, the 1/3 select current supplied by the enable driver will be in the opposite or write direction. Therefore, the direction of 1/3 select current in the enable driver during read and write portions of a memory cycle will be determined by whether the output function $f$ of its respective "or" circuit 78 is true or false during the read and write portions of the cycle.

As described previously, the settings of the address register flip-flops L5 and L9 determine which of the four words on the selected row is to be accessed during the memory cycle, and there are four possible combinations of the states thereof which respectively represent the four words on the selected row. If a true state of a flip-flop is designated as "1" and a false state as "0," the four possible combinations of flip-flops L5 and L9 may then be written as follows with the state of the flip-flop L5 being written first: 00 (both false), 01 (L5 false, L9 true), 10 (L5 true, L9 false) and 11 (both true).

The conditions whereby an output of an "or" circuit 78 will be true or false may now be understood by considering a representative logical equation at the output of one of the "or" circuits 78, for example, the "or" circuit 78 controlling enable driver $E_{1-1}$, whose output equation may be written as $f = E_R(L'_5+L'_9) + E_W M_1 L_5 L_9$. This equation effectively states that the output $f$ will be true if either $E_R(L'_5+L'_9)$ or $E_W M_1 L_5 L_9$ is true, or both are true. Since, as shown in graphs F and G of FIG. 4, the read enable timing pulse $E_R$ is true (negative) only during the read portion of the memory cycle and the write enable timing pulse $E_W$ is true (negative) only during the write portion of the memory cycle, the output $f$ during the read portion of the cycle is determined solely by whether the read term $E_R(L'_5+L'_9)$ is true, and during the write portion of the memory cycle is determined solely by wheather the write term $E_W M_1 L_5 L_9$ is true.

For illustrative purposes, it will again be assumed that the first word on the selected row is the one which is to be accessed during the memory cycle. This means that in the specific enable logic decoder 75 of FIG. 9, the states of flip-flops L5 and L9 (which determine the settings of LL5 and LL9 during the memory cycle) should be set as 11, that is, flip-flop L5 true and flip-flop L9 true. Accordingly, outputs $L_5$ and $L_9$ will also be true while outputs $L'_5$ and $L'_9$ will be false. Thus, during the read portion of the memory cycle where $E_R$ is true and $E_W$ is false, the logical equation $f = E_R(L'_5+L'_9) + E_W M_1 L_5 L_9$ of the "or" circuit 78 controlling enable driver $E_{1-1}$ is also false, since the false condition of $E_W$ makes the entire write term $E_W M_1 L_5 L_9$ false and the false conditions of both $L'_5$ and $L'_9$ make the entire term $E_R(L'_5+L'_9)$ false even though $E_R$ is true.

Consequently, because each enable driver is constructed and arranged to supply 1/3 select current in the read direction when the output of its respective "or" circuit 78 is false, enable driver $E_{1-1}$ whose "or" circuit 78 is false during the read portion of the memory cycle will thereby supply 1/3 select current in the read direction to the core corresponding to the first bit of the first word of the selected row which will add to the 2/3 read select current flowing in the read drive line of the selected row to provide the full select read current required for read out. Since each of the "or" circuits 78 controlling the other enable drivers of enable driver group $E_1$ (that is enable drivers $E_{1-2}$–$E_{1-13}$) corresponding to the other bit positions of the first word on each row also include the same logical term $E_R(L'_5+L'_9)$ in their output function $f$ as does the "or" circuit 78 of enable driver $E_{1-1}$ (the write terms thereof being also false because $E_W$ is false during the read portion of the memory cycle), their output functions $f$ will likewise be false and their respective enable drivers will therefore supply 1/3 select current in the read direction to add to the 2/3 read select current in the read drive line of the selected row to permit the cores corresponding to the other bits of the first word on the selected row to be read out in the same manner as is the first bit core driven by enable driver $E_{1-1}$.

On the other hand, the output functions $f$ of "or" circuits 78 controlling enable driver groups $E_2$, $E_3$, and $E_4$ which respectively correspond to the unselected second, third, and fourth words on the row, will have read terms of $E_R(L'_5+L_9)$, $E_R(L_5+L'_9)$, and $E_R(L_5+L_9)$, respectively, all of which have either $L_5$ or $L_9$ therein. Since both $L_5$ or $L_9$ are true, all of these read terms will be true during the read portion of the memory cycle when $E_R$ is true, thereby causing each "or" circuit 78 which controls an enable driver corresponding to an unselected word to provide a true output function thereto. As a result, enable drivers driving cores of unselected words on the selected row will supply 1/3 select current in the write direction which opposes the 2/3 read select current in the read drive line of the selected row to provide a resultant current to unselected cores in the row of only 1/3 read select current, thereby maintaining the cores of unselected words essentially undisturbed.

Now, considering the write portion of the memory cycle, the write term of the output function $f$ of each "or" circuit 78 is applicable, all the read terms being false, since $E_R$ is false. In particular, the write term $E_W M_1 L_5 L_9$ of "or" circuit 78 controlling enable driver $E_{1-1}$ may be considered as representative. Since $E_W$ is true during the write portion of the cycle, and $L_5$ and $L_9$ are also true, the write term $E_W M_1 L_5 L_9$ feeding enable driver $E_{1-1}$ will also be true if memory register output $M_1$ is true. In such case enable driver $E_{1-1}$ will supply 1/3 select current in the write direction to the first bit position core in the selected row which will add to the 2/3 write select current in the write drive line of the selected row to provide the full write current required to write a "1."

However, if it is desired to write a "0", $M_1$ is chosen false making $E_W M_1 L_5 L_9$ false along with the read term $E_R(L'_5+L'_9)$ so that the entire function $f$ will also be false. Thus, enable driver $E_{1-1}$ will then supply 1/3 select current in the read direction to oppose the 2/3 write select current and maintain the first bit position core of the first word in the "0" state to effectively store a "0" therein.

The "or" circuits 78 controlling the other enable drivers $E_{1-2}$–$E_{1-13}$ of enable driver group $E_1$ also have write terms of the form $E_W M_n L_5 L_9$ (where $M_n$ represents the particular one of the 13 memory register outputs $M_1$–$M_{13}$ to which the bit position of each enable driver corresponds). Thus, these other enable drivers of enable driver group $E_1$ will likewise supply 1/3 write select current to write a "1" if its respective memory register output $M_n$ is true, and 1/3 read select current to write a "0" if its respective memory register output $M_n$ is false.

Since the write terms of the "or" circuits 78 controlling enable driver groups $E_2$, $E_3$, and $E_4$, which correspond to the unselected second, third, and fourth words on the selected row, all contain either $L'_5$ or $L'_9$, both of which are false, the output functions $f$ of all these "or" circuits 78 are false (the read terms also being false since $E_R$ is false). Thus, the enable drivers controlled thereby all supply 1/3 read select current to oppose the 2/3 write current in the write drive line of the selected row, and thereby maintain the cores corresponding to unselected words on the row essentially undisturbed during the write portion of the memory cycle as well as during the read portion of the cycle.

*Specific embodiment of an enable driver*

Now that the operation of the enable logic decoder 75 has been described, a specific embodiment of a highly advantageous form of enable driver will next be considered. It is to be understood that all enable drivers may be similarly constructed and arranged. It is also to be understood that while the specific embodiment of the enable driver to be described herein is highly advantageous, other forms of enable drivers may also be satisfactorily employed.

Referring to FIG. 10, the enable driver $E_{1-1}$ is illustrated basically comprising four PNP transistors, 86, 87, 88, and 89, a transformer 85 and a pulse generator 106. The collectors of transistors 86 and 89 are commonly connected at a junction 113 and the emitters of transistors 87 and 88 are commonly connected at a junction 111. Also, the emitter of transistor 86 and the collector of transistor 87 are commonly connected at a junction 112 and the collector of transistor 88 and the emitter of transistor 89 are commonly connected at a junction 114. A voltage source E+ is applied to the junction 111 of the commonly connected emitters of transistors 87 and 88 through a load resistor 91 and an inductor 99, and a negative voltage source E− is connected to the junction 113 of the commonly connected collectors of the transistors 86 and 89 through a load resistor 95.

The transformer 85 has a primary winding 80 and four secondary windings 81, 82, 83, and 84 wound so as to provide voltages having the indicated polarities in response to a signal applied to the primary winding 80 from the pulse generator 106; the pulse generator 106 provides an output signal only when the input applied thereto from its respective "or" circuit 78 is true. Each of the four secondaries 81, 82, 83, and 84 of the transformer 85 is connected between the base and emitter of one of the four transistors 86, 87, 88, and 89, respectively as shown in FIG. 10.

The transistors 87 and 89, shown cross-hatched in FIG. 10, have their bases biased to saturation by means of a negative voltage bias source $V_B-$ applied to the base thereof, through an input network consisting of a coil 93 and a bias resistor 94. The voltage source $V_B-$ is chosen in conjunction with the resistor 94 to provide saturation bias current to the bases of transistors 87 and 89, while the coil 93 is provided to overcome undesirable transient effects which might occur during switching. Also, a resistor 92 and a diode 91 are provided in series with secondary windings 82 and 84 applied between the base and emitter of transistors 87 and 89, respectively, to limit current flow and reduce undesirable transient effects. The other two transistors 86 and 88 are biased to cut off by means of a positive voltage bias V+ applied through a bias resistor 97; the bias V+ being chosen in conjunction with the value of the bias resistor 97 so that the transistors 86 and 88 are cut off in the absence of a signal applied to the primary winding 80. Also, a network 24 is provided in series with secondary windings 81 and 83 applied between the base and emitter of transistors 86 and 88 of the transformer 85, to limit current flow while providing a fast switching response.

The enable line 14 which passes through the first column of cores in array 150 (FIG. 1), is connected to its respective enable driver $E_{1-1}$ at the junction 114 of the emitter of transistor 89 and the collector of transistor 88, and the return enable line 14' is connected to the junction 112 of the emitter of transistor 86 and the collector of transistor 87.

In order to protect the transistors 86, 87, 88, and 89 from excess voltage signals, a zener diode 105 is connected across junctions 112 and 114 by means of the four diodes 102, 103, 108, 109, and is connected across junctions 111 and 113 by means of the diode 101, as shown in FIG. 10. The zener diode 105 has its plate connected to the junction of the commonly connected collectors of transistors 86 and 89 and also to the junction 113 of the commonly connected plates of diodes 102 and 103, while its cathode is connected to the junction of the commonly connected cathodes of diodes 101, 108, and 109, the cathode of diode 102 and the plate of diode 108 being connected to junction 114, the cathode of diode 103, and the plate of diode 109 being connected to junction 112, and the plate of diode 101 being connected to junction 111 of the commonly connected emitters of transistors 87 and 88.

The operation of the specific enable driver $E_{1-1}$ shown in FIG. 10 may now be explained as follows. If it is first assumed that the output of "or" circuit 78 is false (that is, zero voltage), the pulse generator 106 will apply no signal to the primary winding 80 of the transformer 85 and, therefore, all the secondary windings 81, 82, 83, and 84 will have zero voltage thereacross. For this condition, the cross-hatched transistors 87 and 89 will be saturated and current will flow between voltage sources E+ and E— through enable lines 14 and 14' by way of transistors 87 and 89 as illustrated by the dashed lines and arrows in FIG. 10. Specifically, current will flow from voltage source E+ through resistance 90, through the saturated transistor 87, through enable return line 14', through enable line 14, through saturated transistor 89, and then through the load resistor 95 to the negative voltage source E—. As shown in FIG. 10, the current thus caused to flow is $I/3$, that is, 1/3 read select current.

If it is now assumed that the output of "or" circuit 78 becomes true (that is, negative), the pulse generator 106 will apply a voltage across the primary winding 80 of the transformer 85 having the polarity indicated. Voltages will thereby be induced in the secondary windings 81, 82, 83, and 84 of the transformer 85 having the polarities indicated. Secondary windings 82 and 84 thereby apply positive voltages to the bases of initially saturated transistors 87 and 89 which are chosen to be of sufficient magnitude to drive these transistors 87 and 89 to cut off. Secondary windings 81 and 83 on the other hand, apply negative signals to transistors 87 and 89 which are chosen to be of sufficient magnitude to drive these transistors 87 and 89 to saturation. Thus, current will now flow between sources E+ and E— through enable lines 14 and 14' in the opposite direction by way of saturated transistors 86 and 88 as shown by the dotted lines and arrows in FIG. 10. The current thus flowing is $-I/3$ or 1/3 write select current.

It will be understood that voltage sources E+ and E— and resistors 90 and 95 may be readily chosen in conjunction with the breakdown voltage of the zener diode 105 so that the current flowing in enable lines 14 and 14' has the desired magnitude equal to 1/3 read or 1/3 write current depending upon whether transistors 87 and 89 or transistors 86 and 88 are saturated.

The action of the zener diode 105 and associated diodes 101, 102, 103, 108, and 109 should now be apparent in view of the above description. In particular, it will be understood because of transient effects occurring during switching, the voltage across junctions 111 and 113, or the voltage across junctions 112 and 114, may tend to rise to prohibitive values. However, by proper choice of the zener diode 105, which conducts whenever its breakdown voltage is exceeded, the voltages appearing across these junctions during switching can be prevented from rising above a value which would be unsafe for the transistors.

While the various embodiments of the invention shown herein are admirably adapted to fulfill the objects primarily stated, it will be understood and appreciated by those skilled in the art that a wide variety of modifications and arrangement of the embodiments described herein within the scope of the invention as defined in the appended claims.

For example, the novel method of operating an array of bistable magnetic elements disclosed herein in connection with the memory array 150 is also applicable for use in selecting elements in arrays of bistable elements which may be provided for purposes other than data storage, such as where the array is employed to initiate logical operations or for decoding purposes. In arrangements of this type each bistable magnetic element may be initially biased to one of its two stable states, and when selected by the novel method described herein, switches to its opposite state, and is then returned to its initial state by the bias after the selecting coercive effects are removed. The novel method of operating an array disclosed herein is intended to include within its scope such uses thereof, since the application of the method for providing reading and writing in a memory core array is merely a specific example of the possible uses.

Also, it will be appreciated that although the currents applied to the read and write drive lines and the enable lines have been designated as $2I/3$, $-2I/3$, $I/3$, or $-I/3$ in the above description and in the appended claims, it is to be understood that approximations of these current magnitudes are permissible without deleteriously effecting the operation of the array; the tolerances applicable are determined by the characteristics of the particular bistable magnetic elements employed in the array and the uniformity thereof, as well as by the effects of environmental changes thereon. Thus, these specific values of $2I/3$, $-2I/3$, $I/3$, or $-I/3$ appearing in the previous description and in the appended claims should not be interpreted as restricting the invention to these precise values, but should be considered as including within their scope any variations therein or approximations thereof which may be possible as a result of the characteristics of the particular bistable elements employed in the array, taking into account any restrictions which may be dictated by environmental conditions.

The above examples of possible variations and modifications are not to be considered as exhaustive and the invention is intended to include all possible variations and modifications coming within the scope of the invention as defined in the appended claims.

What is claimed is:

1. Magnetic data-storage means comprising: an array of bistable magnetic elements functionally arranged to be driven in rows and columns, row and column coercing windings coupled to respective rows and columns of said elements, each element being coercible from either one to the other of its two stable states by an applied coercing current denoted by I in one direction and —I in the opposite direction, and each element being relatively undisturbed by application of a coercing current having a magnitude of $I/3$, means for applying a coercing current of $2I/3$ during a reading interval and $-2I/3$ during a writing interval to the elements in a selected row of said array via their respective row windings, said selected row containing a plurality of multi-bit words in which only a single selected multi-bit word is to be read out and written into during respective reading and writing intervals; logical circuit means for indicating which elements of the selected row correspond to the selected word; means responsive to said logical circuit means for applying a coercing current of $I/3$ during respective reading and writing intervals in either the read or write direction to each column of elements in said array via its respective column windings, said direction being determined by whether the column contains an element of the selected word; means controlling the time of application and the direction of the coercing current applied by the two last mentioned means so that during a reading interval the selected elements in the selected row receive a resultant coercing current of I, while unselected elements in the selected row receive a resultant coercing current of $I/3$, and all other unselected elements in unselected rows of the array receive a coercing current of either $I/3$ or $-I/3$, and so that during a writing interval those elements of the selected elements in a selected row in which one binary digit is to be stored receive a resultant coercing current of $-I$, while the other selected elements in the selected row in which the other binary digit is to be stored as well as all unselected elements in the selected row receive a resultant coercing current of $-I/3$, and all other unselected elements in unselected rows in the array receive a coercing current of either $I/3$ or $-I/3$; and means coupled to the elements in said array for providing an electrical indication in response to the switching of at least one of the selected elements during the reading interval.

2. Magnetic data-storage means comprising: an array of bistable magnetic elements functionally arranged to be driven in rows and columns, row and column coercing windings coupled to respective rows and columns of said elements, each element being coercible from either one to the other of its two stable states by an applied coercing current denoted by I in one direction and $-I$ in the opposite direction, and each element being relatively undisturbed by application of a coercing current having a magnitude of $I/3$; linear selection row drive means coupled to the row coercing windings for applying a coercing current of $2I/3$ during a reading interval and $-2I/3$ during a writing interval to the elements in a selected row of said array via their respective row windings, said selected row containing a plurality of multi-bit words in which only a single selected multi-bit word is to be read out and written into during respective reading and writing intervals; logical circuit means for indicating which elements of the selected row are to be selected for reading and writing; column drive means coupled to the column coercing windings for applying a coercing current of $I/3$ to each column of said array in either the read or write direction; row control means coupled to and controlling said row drive means to provide a coercing current of $2I/3$ to the elements of the selected row in said array during a reading interval and a coercing current of $-2I/3$ to the selected row during a writing interval; column control means coupled to said logical circuit means and controlling said column drive means to provide during the reading interval a coercing current of $I/3$ to those columns containing a selected element and a coercing current of $-I/3$ to all other columns, and to provide during the writing interval a coercing current of $-I/3$ to those columns containing a selected element in which one binary digit is to be stored, and a coercing current of $-I/3$ to those columns containing a selected element in which the other binary digit is to be stored and to all other columns; and means coupled to the elements in said array for providing an electrical indication in response to the switching of each selected element during the reading interval.

3. Magnetic data-storage means comprising: an array of bistable magnetic elements functionally arranged to be driven in rows and columns, row and column coercing windings coupled to respective rows and columns of said elements, the states of the elements in each row representing the bits of a plurality of multi-bit words, and the states of the elements in each column representing corresponding bit positions of corresponding words in each row, each element being coercible from either one to the other of its two stable states by an applied coercing current denoted by I in one direction and $-I$ in the other direction, and each element being relatively undisturbed by application of a coercing current having a magnitude of $I/3$; an address register whose settings determine the selected word in the array to be accessed during respective reading and writing intervals, said address register having a row address portion and a column address portion; linear selection row drive means coupled to the row coercing windings for applying a coercing current of $2I/3$ a reading interval and $-2I/3$ during a writing interval to the elements of a selected row in said array; column drive means coupled to the column coercing winding for applying a coercing current of $I/3$ in either the read or write direction to the elements of each column in said array; first timing said decoder means coupled to said row drive means and the row portion of said address register for controlling said row drive means to apply a coercive effect of $2I/3$ during a reading interval and $-2I/3$ during a writing interval to a row selected in accordance with the setting of the row portion of said address register; a second register for storing the binary bits to be written into the elements of the selected word during the writing interval; and second timing and decoder means coupled to said column drive means as well as to said second register and the column portion of said address register for controlling the direction of coercing current of $I/3$ applied to each column by said column drive means during reading and writing intervals, said column drive means being controlled so that during a reading interval those columns containing an element of a selected word on the selected row, as determined by the settings of the column portion of said address register, received a coercing current of $I/3$, while all other columns receive a coercing current of $I/3$, and during a writing interval the direction of coercing current of $I/3$ applied to each column being controlled so that those columns containing a selected element in which one binary digit is to be stored, as determined by the settings of said second register, receive a coercing current of $-I/3$ from said column drive means, while those columns containing a selected element in which the other binary digit is to be stored as well as all other columns received a coercing current of $I/3$.

4. The invention in accordance with claim 3, wherein said linear selection row drive means comprises: a first plurality of row drive means for driving groups of rows at one end of the rows in the array, a second plurality of row drive means for driving correspondingly positioned rows in each group of rows at the other end of the rows in the array, and coercive source means for applying a coercing current of either $2/I3$ or $-2/I3$ to the row having row drive means activated at both ends thereof; and wherein said first timing and decoder means includes: a first decoder coupled to said plurality of row drive means and a second decoder coupled to said second plurality of row drive means, each decoder having a plurality of bistable magnetic decoder elements biased to one of their two bistable states, means for linearly selecting and driving one decoder element in each decoder towards its opposite state, the particular decoder element in each decoder being selected in response to the settings of the row portion of said address register, each of said decoder elements being constructed and arranged so that the selected decoder elements in said first and second decoders activate respective ones of said first and second row drive means to cause a coercive effect of $2I/3$ and $-2/I3$ to be applied to the selected row during respective reading and writing intervals.

5. The invention in accordance with claim 4, wherein each of said first and second row drive means includes a pair of drivers, one of which is a read driver and the other is a write driver; and wherein each decoder element includes read and write output windings respectively coupled in opposite polarity to a pair of read and write drivers, whereupon signals induced therein in response to the selection of a decoder element activate only the read driver coupled to the read output winding of the selected decoder element in other decoder during the reading interval, and only the corresponding write driver coupled to the write output winding of the selected decoder element during the writing interval.

6. The invention in accordance with claim 5, wherein said column drive means includes a column driver for each column in said array, each column drive comprising four transistors, a transformer having a primary winding and four secondary windings, one secondary winding being coupled to the input of each transistor, and associated circuit means, said transistors and transformer being constructed and arranged in conjunction with said associated circuit means so that in the absence of a signal applied to the primary winding of said transformer only two of the four transistors will be conducing, permitting a current to flow therethrough which applies a coercive effect of $I/3$ to the respective column of elements driven by said column driver, and upon the application of a signal to the primary winding of said transformer, only the two other transistors will become conducting, permitting a current to flow therethrough which applies a coercive effect of $-I/3$ to the respective column of elements driven by said column driver.

7. In combination, an array of bistable magnetic elements functionally arranged in rows and columns, and improved row drive and decoder means for applying a coercive effect to a selected row of elements in said array, said means comprising: a first plurality of read and write drivers for driving groups of rows at one end of the rows in the array; a second plurality of read and write drivers for driving correspondingly positioned rows in each group of rows at the other end of the rows in the array; coercive source means for applying a coercive effect in the read direction to the row having read drivers activated at both ends thereof, and in the write direction to the row having write drivers activated at both ends thereof; and first and second decoder means respectively coupled to said first and second plurality of read and write drivers, each decoder comprising a plurality of bistable magnetic decoder elements biased to one of their two bistable states, each decoder element having read and write output windings respectively coupled to a pair of read and write drivers, driving means for driving a selected one of said decoder elements in each decoder from the state to which it is biased towards the opposite state, each decoder element being constructed and arranged in conjunction with the read and write drivers to which its read and write output windings are respectively coupled so that the driving of a selected decoder element from the state in which it is biased towards the opposite state causes opposite polarity signals to be induced in the read and write output windings thereof to activate the read driver coupled to the read output winding while preventing the corresponding write driver from being activated, the return of the decoder element to the state in which it is biased when said driving means is removed then causing a reversal in the polarity of the signals induced in said read and write output windings so that the write driver will now be activated while the read driver is prevented from being activated.

8. The invention in accordance with claim 7, wherein said means for driving includes linear selection means for selecting a particular decoder element in each decoder.

9. The invention in accordance with claim 8, wherein said coercive source means includes a source of electrical current, an inductor in series with the output of said source, a dummy load connected across said inductor and said source, and means for electrically disconnecting said dummy load to permit said coercive source means to apply a coercive effect to the selected row in the array by way of the activated drivers.

10. In combination, a plurality of first drivers, an equal plurality of second drivers, and decoder means for activating a selected one of said first drivers during a first interval and a selected one of said second drivers during a second interval, each of said decoder means comprising: a plurality of bistable magnetic decoder elements, means for biasing each of said decoder elements to one of its two bistable states, a first output winding on each decoder element coupled to a corresponding one of said first drivers, a second output winding on each decoder core coupled in opposite polarity to a corresponding one of said second drivers, one decoder core being provided for each pair of first and second drivers, and linear selection means for applying during said first interval a predetermined driving effect to a selected one of said decoder elements so as to drive the selected element from its biased state towards its other state by an amount sufficient to induce signals in the first and second output windings thereon, the polarity of coupling of said windings and the signals induced therein being chosen in conjunction with the construction and arrangement of said decoder elements and said first and second drivers so that the respective one of said first drivers coupled to the first output winding of the selected decoder element receives a signal of a polarity which causes activation thereof while the respective one of said second drivers coupled to the second output winding of the selected decoder element receives a signal of opposite polarity which prevents activation thereof, and when the predetermined driving effect applied to the selected decoder element by said linear selection means is removed during said second interval, the return of the selected decoder element back to its biased state by said means for biasing causes a reversal in the polarity of the signals induced in the first and second output windings of the selected decoder element during said second interval to now activate the respective one of said second drivers, while the respective one of said first drivers is prevented from being activated.

11. The invention in accordance with claim 10, wherein each of said first and second drivers includes a transistor and associated circuitry arranged so that the application of a signal of one polarity from the respective decoder element output winding coupled thereto causes the transistor to become conducting and thereby activate its respective driver, while the application of a signal of opposite polarity acts to cut off said transistor and thereby prevent activation of its respective driver.

12. The combination of an array of bistable magnetic elements functionally arranged in rows and columns, and improved column driver means therefor, said column driver means including a column driver comprising four transistors, a transformer having a primary winding and four secondary windings respectively coupled to the inputs of said transistors, power supply means, means biasing two of said transistors to the conducting state, means biasing the other two transistors to cut-off, means coupling at least one of said columns of said array to said driver means so that current provided by said power supply means flows by way of the two conducting transistors to apply a coercive effect in one direction to at least one of the columns of said array, and means for applying a signal to the primary winding of said transformer, the signal applied being chosen in accordance with the construction and arrangement of said transistors and the secondary windings of said transformer as well as the coupling of at least one column to said driver means so that when said signal is applied to the primary winding the two conducting transistors are cut off while the two cut off transistors become conducting, whereupon said current provided by said power supply means is caused to flow by way of the two transistors now conducting to apply a coercive effect to at least one of said columns in the opposite direction.

13. The invention in accordance with claim 12, wherein said transistors each have base, emitter, and collector elements, the four transistors being arranged so that the emitters of first and second ones of said transistors are commonly coupled, the collectors of third and fourth ones of said transistors are commonly coupled, and the collectors of the first and second transistors are commonly coupled to the respective emitters of the third and fourth transistors; wherein said power supply means has a source of one polarity coupled to the commonly coupled emitters of the first and second transistors and a source of the other polarity coupled to the commonly coupled collectors of the third and fourth transistors; and wherein a column of elements of said array is connected to said driver means across first and second junctions respectively formed by the commonly coupled collector and emitter of the first and third transistors and the commonly coupled collector and emitter of the second and fourth transistors.

14. The invention in accordance with claim 13, voltage regulation means being additionally provided comprising a zener diode and first, second, third, fourth and fifth diodes, said first and second diodes having their plates coupled to the plate of said zener diode and their cathodes respectively coupled to said first and second junctions, said third and fourth diodes having their cathodes coupled to the cathode of said zener diode and their plates respectively coupled to said first and second junctions, and said fifth diode having its cathode coupled to the cathode of said zener diode and its plate coupled to the junction formed by the commonly coupled emitters of said first and second transistors, the plate of said zener diode also being coupled to the junction formed by the commonly coupled collectors of said third and fourth transistors.

15. Data-storage means comprising: an array of bistable elements functionally arranged in rows and columns, the states of the elements in each row representing the bits of a plurality of multi-bit words, and the states of the elements in each column representing corresponding bit positions of corresponding words in each row, each element being coercible from either one to the other of its two stable states by an applied coercing current denoted by $I$ in one direction and $-I$ in the other direction, and each element being relatively undisturbed by application of a coercing current of $I/3$ or $-I/3$, said data-storage means comprising: linear selection means for applying a coercing current of $2I/3$ during a reading interval and $-2I/3$ during a writing interval to the elements in a selected row in the array, said selected row containing a selected word in the array which is to be accessed; logical circuit means for indicating which elements of the selected row correspond to the selected word; means operative during said reading interval and responsive to said logical circuit means for applying a coercing current of $I/3$ to those columns in the array containing elements of the selected word and a coercing current of $-I/3$ to all other columns in the array, whereby only elements of the selected word will receive a coercing current of $I$ during the reading interval while all other elements will receive a coercing current of only $I/3$ or $-I/3$; register means for storing binary data designated as "1" and "0" which is to be written into the selected word during said writing interval; and means operative during said writing interval and responsive to said register means and said logical circuit means for applying a coercing current of $-I/3$ to those columns containing elements of the selected word which are to have a binary "1" written therein and for applying a coercing current of $I/3$ to all other columns, whereby said binary data will be written into the elements of the selected word during said writing interval while elements of unselected words in the array will remain relatively undisturbed.

16. Data-storage means comprising: an array of bistable elements functionally arranged in rows and columns, the states of the elements in each row representing the bits of a plurality of multi-bit words, and the states of the elements in each column representing corresponding bit positions of corresponding words in each row, each element being coercible from either one to the other of its two stable states by an applied coercing current denoted by $I$ in one direction and $-I$ in the other direction, and each element being relatively undisturbed by application of a coercing current of $I/3$ or $-I/3$, said data-storage means comprising: address register means containing the address of a selected word in the array; linear selection means responsive to said address register means for applying a coercing current of $2I/3$ during a reading interval and $-2I/3$ during a writing interval to the elements in the row of the array containing the selected word; means operative during said reading interval and responsive to said address register means for applying a coercing current of $I/3$ to those columns in the array containing elements of the selected word and a coercing current of $-I/3$ to all other columns in the array, whereby only elements of the selected word will receive a coercing current of $I$ during the reading interval while all other elements receive a coercing current of only $I/3$ or $-I/3$; data register means for storing binary data designated as "1" and "0" which is to be written into the selected word during said writing interval; means operative during said writing interval and responsive to both said address register means and said data register means for applying a coercing current of $-I/3$ to those columns containing elements of the selected word which are to have a binary "1" written therein and for applying a coercing current of $I/3$ to all other columns, whereby said binary data will be written into the elements of the selected word during said writing interval while elements of unselected words in the array will remain relatively undisturbed; and a plurality.

References Cited by the Examiner

UNITED STATES PATENTS

| 2,980,899 | 4/61 | Katz | 340—347 |
| 3,027,546 | 3/62 | Howes et al. | 340—166 |

OTHER REFERENCES

Publication I: RCA Review "Static Magnetic Matrix Memory and Switching Circuits," by Rajchman, June 1952, pp. 183–201.

IRVING L. SRAGOW, *Primary Examiner*.

JOHN F. BURNS, *Examiner*.

UNITED STATES PATENT OFFICE
CERTIFICATE OF CORRECTION

Patent No. 3,195,114                                  July 13, 196.

Robert O. Gunderson et al.

It is hereby certified that error appears in the above numbered patent requiring correction and that the said Letters Patent should read as corrected below.

Column 6, line 53, for "undistured" read -- undisturbed --; column 7, line 70, for "decorder" read -- decoder --; column 9, line 27, for "through°" read -- through --; column 10, line 46, for "bits" read -- bit --; line 56, for "clairty" read -- clarity --; column 11, line 29, for "numbered" read -- number --; column 13, line 68, for "connecetd" read -- connected --; line 74, for "drives" read -- drive --; column 14, line 50, for "desingate" read -- designate --; column 18, line 32, for "I/3" read -- 1/3 - column 19, line 56, after "sense" insert -- line --; column 22, line 25, for "as" read -- a --; column 23, line 49, for "drivers" read -- driver --; column 28, line 63, for "undestood" read -- understood --; column 29, line 35, for "72", second occurrence, read -- 73 --; same column 29, line 75, beginning with "One of the" strike out all to and including "ponds." in line 4, column 30; column 30, line 39, for "understod" read -- understood --; line 55, for "wheather" read -- whether --; line 61, for "$LL_5$ and $LL_9$" read -- LL5 and LL9 --; column 33, line 64, for "assoicated" read -- associated --; column 34, lines 30 and 31, for "effecting read -- affecting --; column 35, line 64, for "pluraility" read -- plurality --; column 36, line 3, after "2I/3", first occurrenc insert -- during --; line 8, for "said", second occurrence, read -- and --; line 47, after "said" insert -- first --; same column 36, line 71, for "other" read -- each --; column 37, lines 10 and 11, for "conducing" read -- conducting --.

Signed and sealed this 15th day of February 1966.

(SEAL)
Attest:

ERNEST W. SWIDER                              EDWARD J. BRENNER
Attesting Officer                               Commissioner of Patents